US010932170B2

(12) United States Patent
Fitzpatrick

(10) Patent No.: US 10,932,170 B2
(45) Date of Patent: *Feb. 23, 2021

(54) SYSTEM AND METHOD FOR PERFORMING NETWORK SELECTION

(71) Applicant: OPENET TELECOM LTD., Dublin (IE)

(72) Inventor: John Fitzpatrick, Kildare (IE)

(73) Assignee: OPENET TELECOM LTD., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,772

(22) Filed: Jul. 6, 2018

(65) Prior Publication Data

US 2018/0317146 A1 Nov. 1, 2018

Related U.S. Application Data

(63) Continuation of application No. 14/604,803, filed on Jan. 26, 2015, now Pat. No. 10,051,533.

(Continued)

(51) Int. Cl.
*H04W 36/04* (2009.01)
*H04W 48/18* (2009.01)
(Continued)

(52) U.S. Cl.
CPC ........... *H04W 36/04* (2013.01); *H04W 48/14* (2013.01); *H04W 48/18* (2013.01); *H04W 24/08* (2013.01);
(Continued)

(58) Field of Classification Search
CPC ..... H04W 36/04; H04W 48/14; H04W 48/18; H04W 36/0083; H04W 36/30;
(Continued)

(56) References Cited

U.S. PATENT DOCUMENTS 5,548,818 A * 8/1996 Sawyer ................. H04W 48/16
455/434
8,174,994 B2 5/2012 Forssell et al.
(Continued)

FOREIGN PATENT DOCUMENTS

EP 2445266 A1 4/2012
WO 2013147587 A1 10/2013

OTHER PUBLICATIONS

Alcatel Lucent, "WiFi Roaming-Building on ANDSF and Hotspot2. 0"; Internet citation, Feb. 27, 2012, pp. 1-45.
(Continued)

*Primary Examiner* — Charles N Appiah
*Assistant Examiner* — Nicole M Louis-Fils
(74) *Attorney, Agent, or Firm* — The Marbury Law Group, PLLC

(57) ABSTRACT

The system and methods of the various embodiments enable fine grained network selection decisions. This may allow a mobile network operator, a cable operator, or a Wi-Fi network operator to define network selection rules that are not only based upon network availability, time, and location, but also on network signal strength, signal to noise ratio, link speed, and cellular network radio parameters. These rules may also be complimented with local device based policies and parameters, which may possibly be based on user preferences and/or network operator preferences. The system and methods of the various embodiments also prevent inadvertent Wi-Fi network selection decisions by incorporating a time threshold parameter which defines a time period for which a wireless device must have detected a specific Wi-Fi access point prior to performing network selection.

21 Claims, 18 Drawing Sheets

Related U.S. Application Data

(60) Provisional application No. 61/932,340, filed on Jan. 28, 2014.

(51) Int. Cl.
| | |
|---|---|
| *H04W 48/14* | (2009.01) |
| *H04W 60/00* | (2009.01) |
| *H04W 24/08* | (2009.01) |
| *H04W 36/00* | (2009.01) |
| *H04W 36/30* | (2009.01) |
| *H04W 36/36* | (2009.01) |
| *H04W 84/04* | (2009.01) |
| *H04W 84/12* | (2009.01) |
| *H04W 88/06* | (2009.01) |

(52) U.S. Cl.
CPC ........ *H04W 36/0083* (2013.01); *H04W 36/30* (2013.01); *H04W 36/36* (2013.01); *H04W 60/005* (2013.01); *H04W 84/042* (2013.01); *H04W 84/12* (2013.01); *H04W 88/06* (2013.01)

(58) Field of Classification Search
CPC . H04W 36/36; H04W 60/005; H04W 84/042; H04W 84/12; H04W 88/06; H04W 24/08
USPC ..................................................... 455/426.1
See application file for complete search history.

(56) References Cited

U.S. PATENT DOCUMENTS

| | | | | |
|---|---|---|---|---|
| 8,185,152 | B1* | 5/2012 | Goldner | H04W 48/18 370/282 |
| 9,100,852 | B2* | 8/2015 | Xiang | H04W 28/0231 |
| 2009/0190533 | A1 | 7/2009 | Zhu et al. | |
| 2009/0310578 | A1* | 12/2009 | Convertino | H04W 76/23 370/338 |
| 2010/0017861 | A1 | 1/2010 | Krishnaswamy et al. | |
| 2010/0296415 | A1 | 11/2010 | Sachs et al. | |
| 2012/0033583 | A1 | 2/2012 | Hu et al. | |
| 2012/0258674 | A1 | 10/2012 | Livet et al. | |
| 2013/0308445 | A1 | 11/2013 | Xiang et al. | |
| 2014/0079022 | A1 | 3/2014 | Wang et al. | |
| 2014/0113640 | A1* | 4/2014 | Sachs | H04W 48/18 455/450 |
| 2014/0162632 | A1* | 6/2014 | Gajula | H04W 48/18 455/426.1 |
| 2014/0204904 | A1 | 7/2014 | Xiang et al. | |
| 2014/0274225 | A1* | 9/2014 | Lacatus | H04W 52/0241 455/574 |
| 2015/0055470 | A1* | 2/2015 | Kahn | H04W 28/0268 370/235 |
| 2015/0074266 | A1 | 3/2015 | Alisawi et al. | |
| 2015/0085650 | A1* | 3/2015 | Cui | H04W 92/02 370/230 |
| 2015/0201371 | A1 | 7/2015 | Tamura et al. | |
| 2015/0341853 | A1* | 11/2015 | Cho | H04W 48/20 370/331 |
| 2016/0174123 | A1* | 6/2016 | Hedberg | H04W 48/18 370/331 |

OTHER PUBLICATIONS

Extended European Search Report issued by the European Patent Office for European Application No. 15152541.7-1854 dated Jun. 22, 2015.

* cited by examiner

SYSTEM AND METHOD FOR PERFORMING NETWORK SELECTION

RELATED APPLICATIONS

This application is a continuation of U.S. application Ser. No. 14/604,803, entitled, "System and Method for Performing Network Selection", filed Jan. 26, 2015, which claims the benefit of priority to U.S. Provisional Application No. 61/932,340, titled "System and Method for Performing Network Selection" filed on Jan. 28, 2014, the entire contents of which are hereby incorporated by reference.

BACKGROUND

Over the last few years mobile network operators have seen unprecedented growth in the amount of mobile data traffic in their networks. This data growth was primarily driven by the smartphone revolution that began with the introduction of the iPhone in 2007, and it has fuelled increased user demand for bandwidth-hungry mobile data services. This resulted in a rapid growth of data volumes that has persisted, and continues to overwhelm many mobile network operators' networks, leading to high levels of network congestion, increased costs, and poor subscriber experience.

At the same time that the demand for mobile data traffic is increasing, mobile network operators are seeing falling revenues per gigabyte commensurate with the amount of data being consumed. This is caused by a variety of factors, including increased competition, "all you can eat" data plans, changing subscriber behaviors and expectations, and subscriber unwillingness to pay for increased data usage.

Mobile data traffic demands are predicted to continue growing rapidly, and if mobile network operators attempt to meet this demand with traditional base stations their radio access network equipment costs will increase significantly. With such growth in data traffic, even new cellular technologies, such as Long Term Evolution (LTE) and LTE Advanced, may not be able to keep pace with the demand.

Wi-Fi provides a low cost alternative to increasing network capacity when compared to traditional mobile phone network deployments because it combines both the benefits of smaller cell sizes and the use of unlicensed spectrum. As a result, mobile network operators are looking to Wi-Fi in an effort to alleviate network congestion and keep expenditures under control. Many mobile network operators have been deploying, and continue to deploy, large scale Wi-Fi networks.

Although mobile network operators have been aggressively deploying Wi-Fi networks, in most cases the Wi-Fi networks have very little integration with the mobile networks. This lack of integration may lead to a number of problems, such as an inability to adequately manage a subscriber's Wi-Fi offloading experience, and the loss of visibility of a subscriber's traffic, offloading behavior, and quality of experience. Further, the subscriber's experience of using operator-provided Wi-Fi is frequently very poor, due to poor quality of service, flaky coverage, and awkward and cumbersome login processes. Subscribers must often know that Wi-Fi provided by their mobile network operator is available in a particular location, and the Wi-Fi network must generally be selected manually. This results in a lot of missed offload opportunities and greatly reduces the utility of mobile network operators' Wi-Fi deployments. As such, improved systems and solutions that provide mobile network operators with the ability to better manage their subscribers' Wi-Fi offloading decisions will be beneficial to network operators and the consumers of their services.

SUMMARY

The various aspects include methods of automatically selecting a wireless communication network for a user equipment device, which may include generating in a processor of a network selection policy server an enhanced network selection rule that includes information suitable for causing the user equipment device to automatically evaluate a condition and determine whether to transition from using a first wireless communication network to using a second wireless communication network, and sending the generated enhanced network selection rule to the user equipment device so as to cause the user equipment device to automatically evaluate the condition and determine whether to transition from using the first wireless communication network to using the second wireless communication network.

In an aspect, the first wireless communication network may be a cellular network and the second wireless communication network may be a Wi-Fi network. In a further aspect, generating the enhanced network selection rule that includes information suitable for causing the user equipment device to automatically evaluate the condition and determine whether to transition from using the first wireless communication network to using the second wireless communication network may include generating the enhanced network selection rule to include information suitable for causing the user equipment device to evaluate whether a value of a radio link property of the first wireless communication network meets or exceeds a threshold value of acceptable radio link properties and transition to the second wireless communication network when the value of the radio link property of the first wireless communication network does not meet or exceed the threshold value of acceptable radio link properties.

In a further aspect, generating the enhanced network selection rule that includes information suitable for causing the user equipment device to automatically evaluate the condition and determine whether to transition from using the first wireless communication network to using the second wireless communication network may include generating the enhanced network selection rule to include information suitable for causing the user equipment device to evaluate whether a value of a radio link property of the second wireless communication network meets or exceeds a threshold value of acceptable radio link properties and transition to the second wireless communication network when the value of the radio link property of the second wireless communication network measured in the user equipment device meets or exceeds the threshold value of acceptable radio link properties.

In a further aspect, generating the enhanced network selection rule that includes information suitable for causing the user equipment device to automatically evaluate the condition and determine whether to transition from using the first wireless communication network to using the second wireless communication network may include generating the enhanced network selection rule to include information suitable for causing the user equipment device to evaluate a lag time value associated with the user equipment device being in a coverage area of the second wireless communication network. In a further aspect, generating the enhanced network selection rule that includes information suitable for causing the user equipment device to automatically evaluate the condition and determine whether to transition from using the first wireless communication network to using the second wireless communication network may include generating the enhanced network selection rule to include information suitable for causing the user equipment device to evaluate a property of the user equipment device.

In a further aspect, generating the enhanced network selection rule that includes information suitable for causing the user equipment device to automatically evaluate the condition and determine whether to transition from using the first wireless communication network to using the second wireless communication network may include generating the enhanced network selection rule to include information suitable for causing the user equipment device to evaluate an application state and contextual information.

In a further aspect, the method may include receiving a network selection policy request message in the network selection policy server from the user equipment device, the network selection policy request message including information measured in the first wireless communication network. In a further aspect, generating the enhanced network selection rule that includes information suitable for causing the user equipment device to automatically evaluate the condition and determine whether to transition from using the first wireless communication network to using the second wireless communication network may include generating the enhanced network selection rule in response to receiving the network selection policy request message from the user equipment device.

In a further aspect, generating the enhanced network selection rule to include information suitable for causing the user equipment device to automatically evaluate the condition and determine whether to transition from using the first wireless communication network to using the second wireless communication network may include generating the enhanced network selection rule to include a network selection policy that includes a plurality of network selection rules, and generating at least one of the plurality of network selection rules based on information obtained from a policy management system, a charging system, and/or a subscriber management system.

In a further aspect, the method may include generating a second enhanced network selection rule based on the information included in the enhanced network selection rule, and sending the generated second enhanced network selection rule to a second user equipment device of a subscriber associated with the user equipment device. In a further aspect, generating the second enhanced network selection rule based on the information included in the enhanced network selection rule may include generating the second enhanced network selection rule to include network selection rules that are different than the network selection rules included in the (first) enhanced network selection rule. In a further aspect, generating the second enhanced network selection rule based on the information included in the (first) enhanced network selection rule may include generating the second enhanced network selection rule to include network selection rules that are in a different format or use a different protocol than the network selection rules included in the (first) enhanced network selection rule.

In a further aspect, the method may include using a machine learning technique to learn network usage patterns of the user equipment device over time, and determining priorities (e.g., network selection priorities) for a plurality of wireless communication networks based on the learned network usage patterns. In a further aspect, generating the enhanced network selection rule that includes information suitable for causing the user equipment device to automatically evaluate the condition and determine whether to transition from using the first wireless communication network to using the second wireless communication network may include generating the enhanced network selection rule to include information suitable for causing the user equipment device to select one of the plurality of wireless communication networks based on its priority.

In a further aspect, generating the enhanced network selection rule that includes information suitable for causing the user equipment device to automatically evaluate the condition and determine whether to transition from using the first wireless communication network to using the second wireless communication network may include generating the enhanced network selection rule to include active and inactive network selection rules. In a further aspect, the method may include performing an operation selected from the group including activating an inactive network selection rule, and deactivating an active network selection rule.

Further aspects may include a network selection policy server computing device that includes a processor configured with processor-executable instructions to perform operations including generating an enhanced network selection rule that includes information suitable for causing a user equipment device to automatically evaluate a condition and determine whether to transition from using a first wireless communication network to using a second wireless communication network, and sending the generated enhanced network selection rule to the user equipment device so as to cause the user equipment device to automatically evaluate the condition and determine whether to transition from using the first wireless communication network to using the second wireless communication network.

In an aspect, the processor may be configured with processor-executable instructions to perform operations such that generating the enhanced network selection rule that includes information suitable for causing the user equipment device to automatically evaluate the condition and determine whether to transition from using the first wireless communication network to using the second wireless communication network includes generating the enhanced network selection rule to include information suitable for causing the user equipment device to evaluate whether a value of a radio link property of the first wireless communication network meets or exceeds a threshold value of acceptable radio link properties, and transition to the second wireless communication network when the value of the radio link property of the first wireless communication network does not meet or exceed the threshold value of acceptable radio link properties.

In a further aspect, the processor may be configured with processor-executable instructions to perform operations further including using a machine learning technique to learn network usage patterns of the user equipment device over time, and determining priorities for a plurality of wireless communication networks based on the learned network usage patterns. In a further aspect, the processor may be configured with processor-executable instructions to perform operations such that generating the enhanced network selection rule that includes information suitable for causing the user equipment device to automatically evaluate the condition and determine whether to transition from using the first wireless communication network to using the second wireless communication network may include generating the enhanced network selection rule to include information suitable for causing the user equipment device to select one of the plurality of wireless communication networks based on its priority.

Further aspects include a non-transitory computer readable storage medium having stored thereon processor-executable software instructions configured to cause a processor to perform operations including generating an enhanced network selection rule that includes information suitable for causing a user equipment device to automatically evaluate a condition and determine whether to transition from using a first wireless communication network to using a second wireless communication network, and sending the generated enhanced network selection rule to the user equipment device so as to cause the user equipment device to automatically evaluate the condition and determine whether to transition from using the first wireless communication network to using the second wireless communication network.

In an aspect, the stored processor-executable software instructions may be configured to cause a processor to perform operations such that generating the enhanced network selection rule that includes information suitable for causing the user equipment device to automatically evaluate the condition and determine whether to transition from using the first wireless communication network to using the second wireless communication network may include generating the enhanced network selection rule to include information suitable for causing the user equipment device to evaluate whether a value of a radio link property of the first wireless communication network meets or exceeds a threshold value of acceptable radio link properties, and transition to the second wireless communication network when the value of the radio link property of the first wireless communication network does not meet or exceed the threshold value of acceptable radio link properties.

In a further aspect, the stored processor-executable software instructions may be configured to cause a processor to perform operations including using a machine learning technique to learn network usage patterns of the user equipment device over time, and determining priorities for a plurality of wireless communication networks based on the learned network usage patterns. In a further aspect, the stored processor-executable software instructions may be configured to cause a processor to perform operations such that generating the enhanced network selection rule that includes information suitable for causing the user equipment device to automatically evaluate the condition and determine whether to transition from using the first wireless communication network to using the second wireless communication network may include generating the enhanced network selection rule to include information suitable for causing the user equipment device to select one of the plurality of wireless communication networks based on its priority.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DESCRIPTION

Figure 1A:
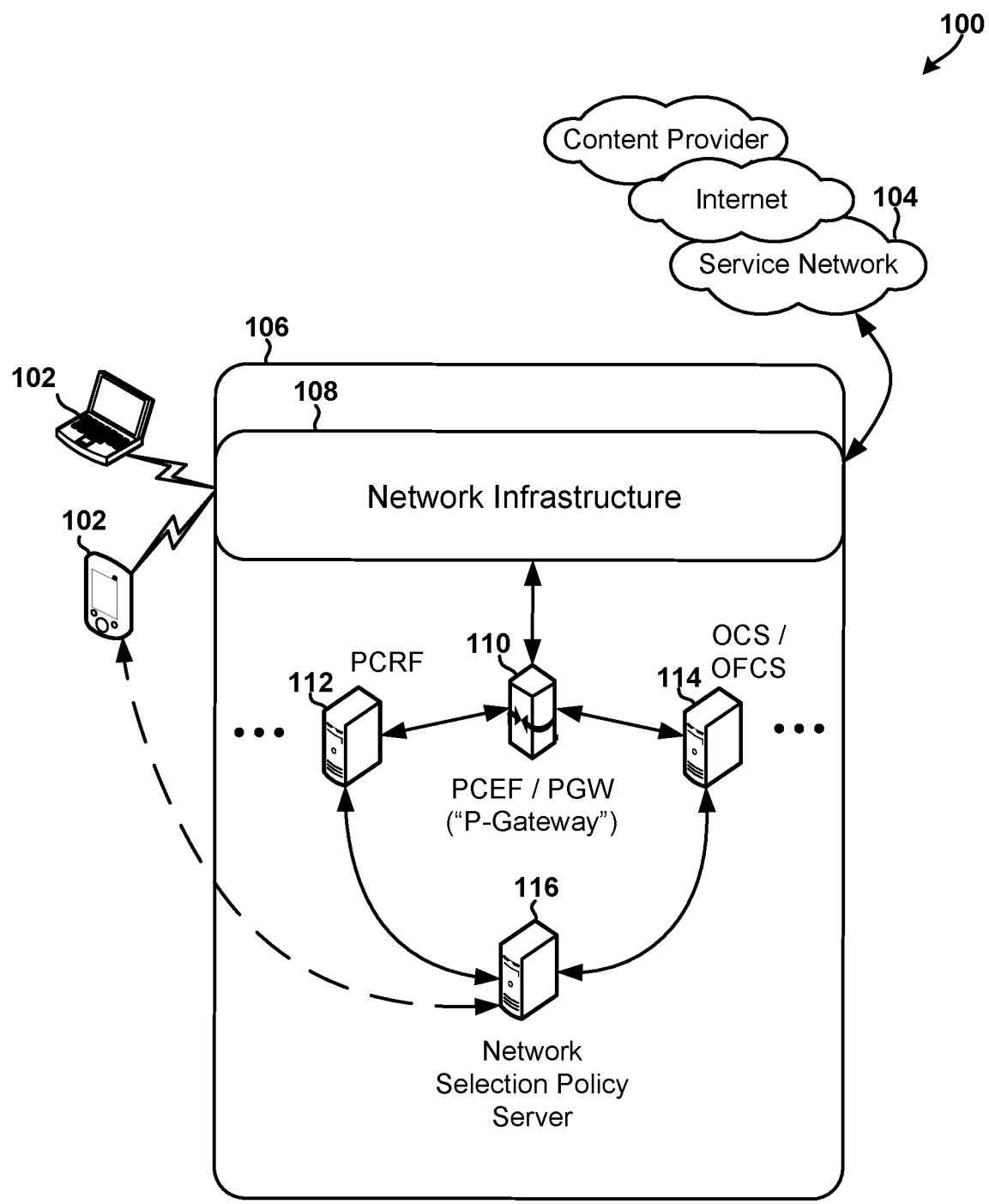
FIGS. 1A and 1B are system block diagrams illustrating telecommunication systems that are suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and computing devices (e.g., network selection policy servers, etc.) configured to implement the methods, of generating and sending enhanced network selection rules (which may include network selection policies, rules, rule groups, and criteria) to wireless devices to cause those devices to make better and more intelligent network selection decisions. The network selection policy server may be configured to generate the enhanced network selection rules based on information received from various components in a telecommunication signaling network, such as a policy management system, a charging system, and a congestion management system. The network selection policy server may also be configured to generate the enhanced network selection rules based on various operating conditions and information received from the wireless device, such as network congestion, device usage patterns, the mobility of the wireless device, etc. The network selection policy server may be further configured to generate the enhanced network selection rules so that they cause the wireless device to intelligently determine priorities for selecting an appropriate network (or network technology) and automatically select the highest priority network/technology that is available. In addition, the network selection policy server may be configured to cause the device to display different icons based on the selected network or enhanced network selection rules.

The various embodiments may also include a wireless device configured to receive and use enhanced network selection rules to make better and more intelligent network selection decisions, such as whether to transition from using a first wireless communication technology to using a second wireless communication technology for all or a portion of its communications (e.g., IP-based data communications, etc.). As examples, the wireless device may use the enhanced network selection rules to intelligently determine whether to transition from using a Wi-Fi network to using a cellular network, whether to transition from using the cellular network to using the Wi-Fi network, whether to transition from using a first Wi-Fi network to using a second Wi-Fi network, and whether to transition from using a Wi-Fi to using another local area wireless communication technology (e.g., WiMAX, etc.). In some embodiments, the network selection policy server and/or wireless device may be configured to perform "offloading" and "onloading" operations. Offloading operations may include the wireless device transferring all or a portion of its communications/traffic from a cellular network to a Wi-Fi network, which may be accomplished by transitioning from using the cellular network to using the Wi-Fi network. Onloading operations may include the wireless device transferring all or a portion of its communications/traffic from the Wi-Fi network to the cellular network, such as by transitioning from using the Wi-Fi network to using the cellular network.

An enhanced network selection rule (ENS rule) may be an information structure that includes network selection policies, network selection rules, network selection criteria, priority information and/or various parameters (e.g., a "no_retry" parameter, lag time parameter, etc.). The network selection policy server may be configured to send multiple ENS rules to client computing devices, each ENS rule may include one or more network selection policies, and each network selection policy may include one or more network selection rules. An embodiment computing device (e.g., a wireless device, etc.) may be configured to enforce a network selection policy in response to determining that all of the network selection rules associated with that network selection policy have been satisfied.

The word "exemplary" is used herein to mean "serving as an example, instance, or illustration." Any implementation described herein as "exemplary" is not necessarily to be construed as preferred or advantageous over other implementations.

As used in this application, the terms "component," "module," "node," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computing device, and/or a computing system.

The terms "user," "subscriber," "consumer," and "customer" may be used interchangeably and refer to the end consumer of services provided by a telecommunications network operator.

The term "hotspot" is used generically herein, and may refer to a physical location that offers Internet access over a wireless local area network (WLAN), such as through a router connected to a link to an Internet service provider. A hotspot may provide a user equipment device access to the Internet via Wi-Fi or other local area wireless technology. A wireless community may include public hotspots (in squares, malls, etc.), public access points, private access points, and private modems, any or all of which may be used by a single subscriber or device to access the service network and/or Internet.

The terms "mobile device," "wireless device" and "user equipment (UE)" may be used interchangeably and refer to any one of various cellular telephones, smart-phones (e.g., iPhone®), personal data assistants (PDA's), palm-top computers, tablet computers, laptop computers, wireless electronic mail receivers (e.g., Blackberry®), VoIP phones, wire-line devices, devices implementing machine-to-machine (M2M) technologies, multimedia/Internet enabled cellular telephones, and similar electronic devices capable of sending and receiving wireless communication signals. A wireless device may include a programmable processor, a memory, and circuitry for wirelessly sending or receiving information. In a preferred embodiment, the wireless device is a cellular handheld device (e.g., a mobile device) which can communicate via a cellular telephone communications network and send/receive wireless communication signals via Wi-Fi or short range wireless communication technologies.

A number of different wireline and wireless communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden).

To focus the discussion on the relevant features and functionalities, the various embodiments may be described with reference to specific architectures and components of Wi-Fi and a 3GPP mobile network. However, all references to terminology and/or technical details related to an individual standard or technology are for illustrative purposes only, and are not intended to limit the scope of the claims to a particular communication system, technology, architecture, or component unless specifically recited in the claim language.

Wi-Fi networks are now widely deployed in various public venues such as airports, train stations, sports arenas, shopping malls, conference centers, restaurants, and so on. In many cases, such venues may be served by more than one Wi-Fi network provider, and intelligently selecting among the available Wi-Fi networks is important for a good customer experience as well as for the operator's business model. Cable operators are using Wi-Fi networks to offer their customers access to online applications and Internet services while outside the home or office (in the case of small businesses), where cable services have historically been delivered. The newest generation of residential broadband gateways from some cable operators also supports both private and public hotspots, allowing authenticated subscribers to connect seamlessly to the advertised public hotspot when outside their home. Some cable operators are also engaged in "roaming partnership" agreements (e.g., Cable-WiFi in the US, etc.), which enable their customers to gain access to the partner's Wi-Fi network when travelling outside their home service area. In such cases, intelligent and automated selection of the most suitable access network is an important requirement. Further, a number of cable and non-mobile communications service providers (CSPs) are proposing to launch Voice over Wi-Fi (VoWi-Fi) services. Such low latency, conversational voice and video services have higher quality of service requirements. Similarly, the expected next-generation of user devices with "soft SIMs", that would allow users to select from among multiple available mobile networks and authenticate and provision to these networks, also highlights the need for more flexible and sophisticated network selection capabilities. For all these reasons, the intelligent selection of an appropriate access network is becoming more important.

The various embodiments include a network selection policy server that may be used by cable operators and other non-mobile CSPs to offer their own customers or their partners' customers access to Wi-Fi networks; such access may be available to both traditional mobile devices (i.e., with SIM) as well as non-SIM (i.e., Wi-Fi only) user devices.

The network selection policy server may be configured to allow the automated selection and connection of a user equipment device (wireless device) to the most suitable access network. The selection decision may be based on one or more of user-defined preferences (e.g., an identified residential/office Wi-Fi network), operator-defined business rules (e.g., a specified preferred roaming partner's network), and various contextual data.

In some embodiments, the network selection policy server may be configured to make network selection decisions (e.g., automatically select a wireless communication network for a user equipment device) by generating and sending an enhanced network selection rule (i.e., an ENS rule) to the user equipment device. The enhanced network selection rule may include information suitable for causing the user equipment device to automatically evaluate a condition or criterion, such as whether select radio link properties of the first and/or second wireless communication networks meet or exceed one or more threshold values, whether the amount of time that the user equipment device spent in the coverage area of the first or second network is greater than or equal to a lag time value, or any of the other conditions, criteria, rules, policies, or decisions discussed in this application (e.g., properties of the user equipment device, software application states, contextual information, etc.). The user equipment device may be configured to select a network and/or determine whether to transition all or a portion of its communications to another network communication network based on the results of evaluating the criteria/conditions identified in the enhanced network selection rule.

In some embodiments, the network selection policy server may be configured to make network selection decisions based on awareness of resources, quality of service of the available access networks, current network utilization rates, signal strength thresholds, quality of experience, network priorities, frequency bands (e.g., 5 GHz vs. 2.4 GHz), etc. In some embodiments, the network selection decisions may be made based on contextual information, such as time of day, device type and location, current connection to an access network, subscriber identity and history, analytics data (e.g., application usage), etc. In some embodiments, the network selection decisions may be made based on the wireless device's ability to attempt a reconnection to preferred networks at a later time, based on configurable parameters (such as a duration threshold), etc.

In some embodiments, the network selection policy server may be configured to make network selection decisions based on information received from other network components, (some of which may reside in a partner's network), including a policy management system, a congestion management system, and a charging system. The network selection policy server may be configured to communicate with policy management and congestion management systems to make better and more informed network selection decisions. Such considerations may also extend to video calling and other rich communications services that are now offered via Wi-Fi networks. Depending on service-specific or application-specific requirements, the network selection policy server may automatically switch the user equipment to a more suitable access network or use a client-based app resident on the user equipment device to prompt the user to switch access networks.

As mentioned above, providing mobile network operators with the ability to manage their subscribers' network selection decisions is important for providing a high quality experience and maximizing the utility of their Wi-Fi infrastructure investment. An Access Network Discovery and Selection Function (ANDSF) component is defined/designed by 3GPP to help mitigate some of the above-mentioned problems of conventional solutions, such as by providing the mobile network operator with more control over device-side network selection decisions. The ANDSF server may be a network selection policy server that is located within the Evolved Packet Core (EPC), and configured to provide network discovery information to user equipments (UEs) about available non-3GPP access networks, and the rules and credentials for selecting these networks. The ANDSF server typically communicates directly with the user equipments over an interface called S14, which may be realized above the Internet Protocol (IP) level. The S14 interface allows for the synchronization of ANDSF rules (encapsulated in OMA-DM model objects) between the user equipment and the server.

The various embodiments configure a network selection policy server with new criteria that can be used to make better and more intelligent network selection decisions.

These criteria can be used in isolation or in combination, and the network selection policy server may combine them with additional information obtained from other systems within the mobile network, such as from a subscriber management system, a policy management system, a charging system, etc.

The various embodiments may be implemented within a variety of communication systems, an example of which is illustrated in FIG. 1A. A typical communication system 100 includes user equipment 102 configured to send and receive voice, data, and control signals to and from a service network 104 (and ultimately the Internet and/or a content provider) via a communications network 106. In the example illustrated in FIG. 1A, the communications network 106 includes a network infrastructure 108 unit that encapsulates various network components/systems implementing any of a variety of communication technologies/protocols to process and route the voice, data and control signals to and from the user equipment 102. The network infrastructure 108 unit may include, for example, components for implementing a cellular telephone network, a radio access network (e.g., UTRAN, RAN, etc.), Wi-Fi network, WiMAX network, and/or other well known communication technologies (e.g., GPRS, UMTS, LTE, cdmaOne, CDMA2000™). Since these structures are well known, certain details have been omitted in order to focus the descriptions on the most relevant features.

The network infrastructure 108 may also include connections to a policy and charging enforcement function (PCEF) 110 component that is connected to a policy management system, a charging system, and other similar components that participate in, collect information from, or otherwise contribute to, communications between the service network 104 and the user equipment 102. In the example illustrated in FIG. 1A, the policy management system includes or is implemented/realized as a policy and charging rules function (PCRF) 112 component. The charging system includes, or is implemented or realized as, online/offline charging systems (OCS/OFCS) 114.

The PCEF 110 component may be responsible for enforcing policy rules to control the bandwidth, the quality of service (QoS), and other characteristics of the communications between the service network 104 and the user equipment 102. The enforcement of policies may also include querying, coordinating, removing, revoking and/or adjusting various resources (e.g., network resources, subscriber resources, etc.) based on the policy rules. The PCEF 110 may also be configured to send signaling information (e.g., control plane information relating to communication setup, security, authentication, charging, enforcement of policy rules, etc.) to the PCRF 112, OCS/OFCS 114, and other similar components.

The PCRF 112 component may be responsible for identifying the appropriate policy and charging rules for a given communication session of a given subscriber or terminal device, and sending the identified policy rules to the PCEF 110 for enforcement. Specifically, the PCRF 112 may be responsible for generating, compiling, and selecting a set of business and technology rules that define the policies that are to be enforced for particular call sessions. The PCRF 112 may make rule decisions on a per-subscriber, per-session and/or per-service basis. For example, the PCRF 112 may use subscriber information (e.g., subscriber's city of residence), the current usage parameters (e.g., day of week, time of day, peak hours, etc.), the subscriber's service level (e.g., Gold, Bronze, etc.), and other information related to the subscriber, session, or service to generate and/or select one or more rules or a rule group. The selected rules or rule group may be communicated to the PCEF 110 as a profile that defines the policies to be enforced.

In addition to receiving rules from the PCRF 112, the PCEF 110 component may also communicate with the OCS/OFCS 114 to identify the policies that are to be enforced and/or to ensure proper charging. For example, the PCEF 110 may periodically inform the OCS/OFCS 114 of services consumed or requested by a subscriber. The OCS/OFCS 114 may include a balance management component that is responsible for determining if the subscriber has sufficient funds/credits/access units to receive a requested service, and may grant or deny access based on the amount of fund/credits/access units available in a subscriber balance account. For example, the OCS/OFCS 114 may issue a quota by identifying an amount of funds, credits, access units, or service units allowance that are authorized for use by the PCEF 114 for a requested service or consumer.

The communication system 100 may also include a network selection policy server 116 configured to intelligently determine, select, communicate, and/or enforce various network selection policies, rules, and criteria. As part of these operations, the network selection policy server 116 may communicate with various systems and components, such as a user equipment, a subscriber management system, a wireless device mobility manager, an access control manager, a policy management system (e.g., the PCRF 112 component, etc.), and a charging system (e.g., the OCS/OFCS 114 component, etc.).

The network selection policy server 116 may be configured to use a combination of network selection criteria received from the operator network and/or information received/obtained from the PCRF 112 and/or OCS/OFCS 114 components to make intelligent network selection and Wi-Fi offloading decisions. The network selection policy server 116 may cause a user equipment 102 device to transition between communication network technologies (e.g., transition from sending and receiving information via a cellular network to sending and receiving the information via a Wi-Fi network, etc.).

In various embodiments, the network selection policy server 116 may implement all or portions of an ANDSF server, may include an ANDSF server, may be included in an ANDSF server, may be implemented or realized as an ANDSF server, and may be an ANDSF server. For example, in an embodiment, the network selection policy server 116 may implement all of the functionalities of an ANDSF server in addition to any or all the functionality/methods discussed in this application.

Figure 1B:
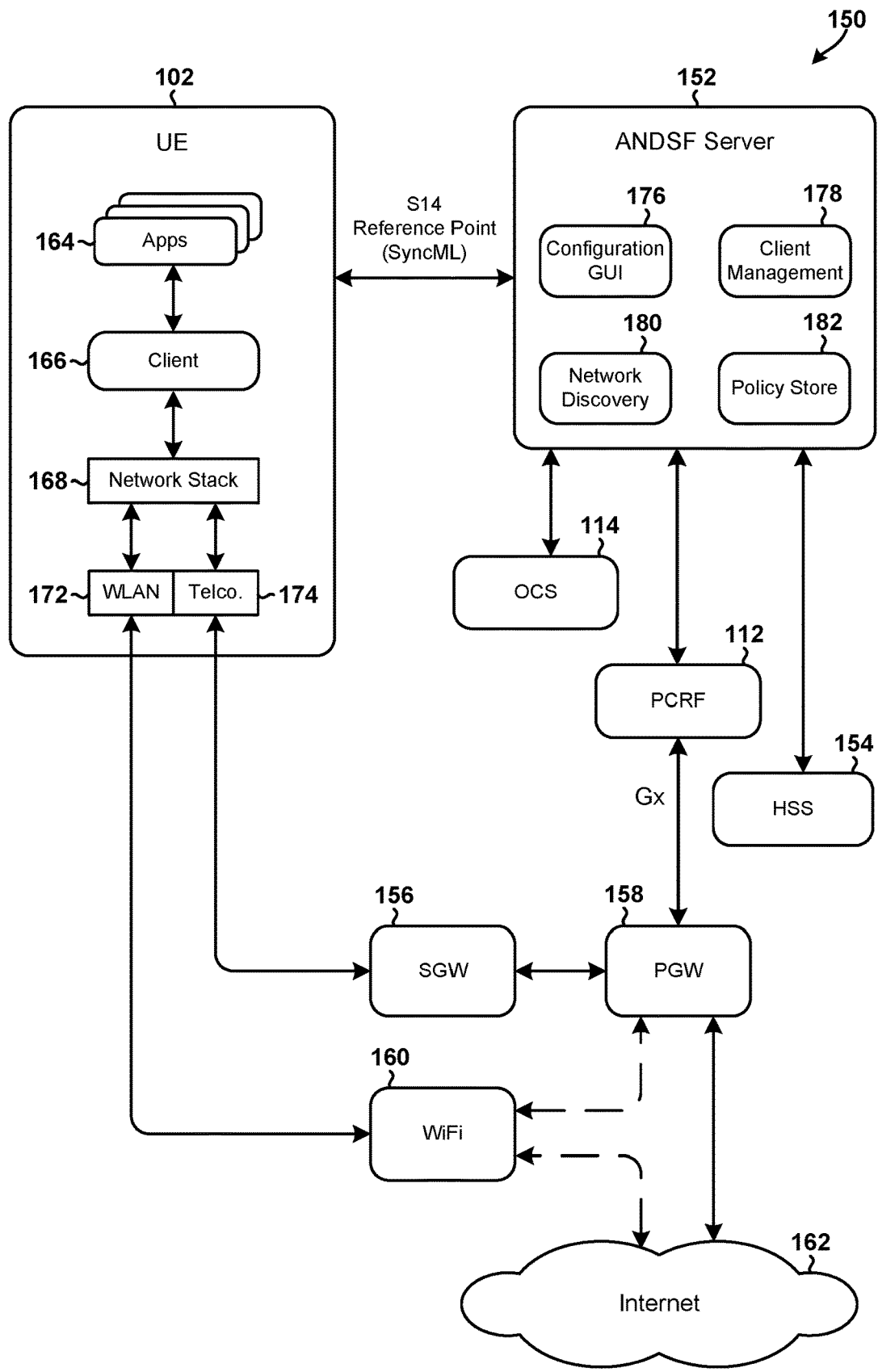

FIG. 1B illustrates another example communication system 150 that is suitable for use with the various embodiments. In the example illustrated in FIG. 1B, the communication system 150 includes a network selection policy server 116 realized as an ANDSF server 152. The system 150 also includes a policy management system realized as a PCRF 112, a charging system realized as an OCS 114, a UE 102 device, and a subscriber management system realized as a home subscriber server (HSS) 154. The communication system 150 further includes a Wi-Fi 160 node, component, system or network, and gateways realized as an SGW 156 component and a PGW 158 component. The Wi-Fi 160 and PGW 158 components may be configured to send and receive communication messages to and from the Internet 162. In an embodiment, the Wi-Fi 160 component may be a Wi-Fi access point.

The ANDSF server 152 may include a configuration graphical user interface (configuration GUI) module 176, a client management module 178, a network discovery module 180, and a policy store module 182. The ANDSF server 152 may be coupled to the OCS 114, PCRF 112, and HSS 154 via wired or wireless communication links. The communication system 150 may also include wireless device mobility manager and an access control manager, which may be coupled to the ANDSF server 152 via wired or wireless communication links. The wireless device mobility manager may be realized as a mobility management entity (MME) component. The access control manager may be realized as an authentication, authorization, and accounting (AAA) component.

The UE 102 may include software application programs 164, a client module 166, a network stack module 168, a wireless local area network (WLAN) module 172, and a mobile telecommunications (Telco) module 174. The WLAN module 172 may include a Wi-Fi radio that is suitable for establishing network connectivity to the Internet 162, which may be accomplished via the Wi-Fi 160 node. The Telco module 174 may include a transceiver configured to establish cellular or wide area network (WAN) connectivity to the Internet 162 via the SGW 156 and/or PGW 158 components. The UE 102 may be configured to transition between these different types of communication technologies (e.g., cellular, Wi-Fi, etc.) without user interaction. For example, the UE 102 may be configured to turn off its WAN and/or cellular communications circuitry and automatically establish a Wi-Fi communication link to the Internet 162 when it is in close proximity to a suitable Wi-Fi access point and/or in response to determining that other network selection criteria have been met.

The UE 102 device (e.g., wireless device) may detect the presence of a Wi-Fi access point in two different ways—using passive scanning and active scanning. In the passive case the Wi-Fi access point periodically (e.g. every 100 ms) broadcasts a beacon frame to announce its presence. In the passive case, the UE 102 listens for a beacon from an access point. In the active case, the UE 102 periodically sends a beacon request to which any Wi-Fi access point in range immediately replies with a beacon frame. The primary difference between these two approaches is the speed with which the UE 102 can detect the presence of an access point, with active scanning being faster. Typically, each beacon frame is transmitted by the access point at the maximum output power and at the lowest link rate that corresponds to the most robust modulation and coding scheme. The result of this is that the Wi-Fi signals travel the furthest distance possible, and can be decoded by user equipment devices that are located at the very edge of the range or coverage limit of the access point.

Typically, a UE 102 device will attempt to attach to, or present the user with the ability to attach to, any Wi-Fi access point that is "in range." An access point may be in range when the UE 102 can detect and successfully decode the beacon frame. A problem with this approach is that, although the device is in range, it may be on the coverage edge with relatively poor radio link quality, which may result in low link speeds and slow communications that degrade the user experience.

Figure 2:
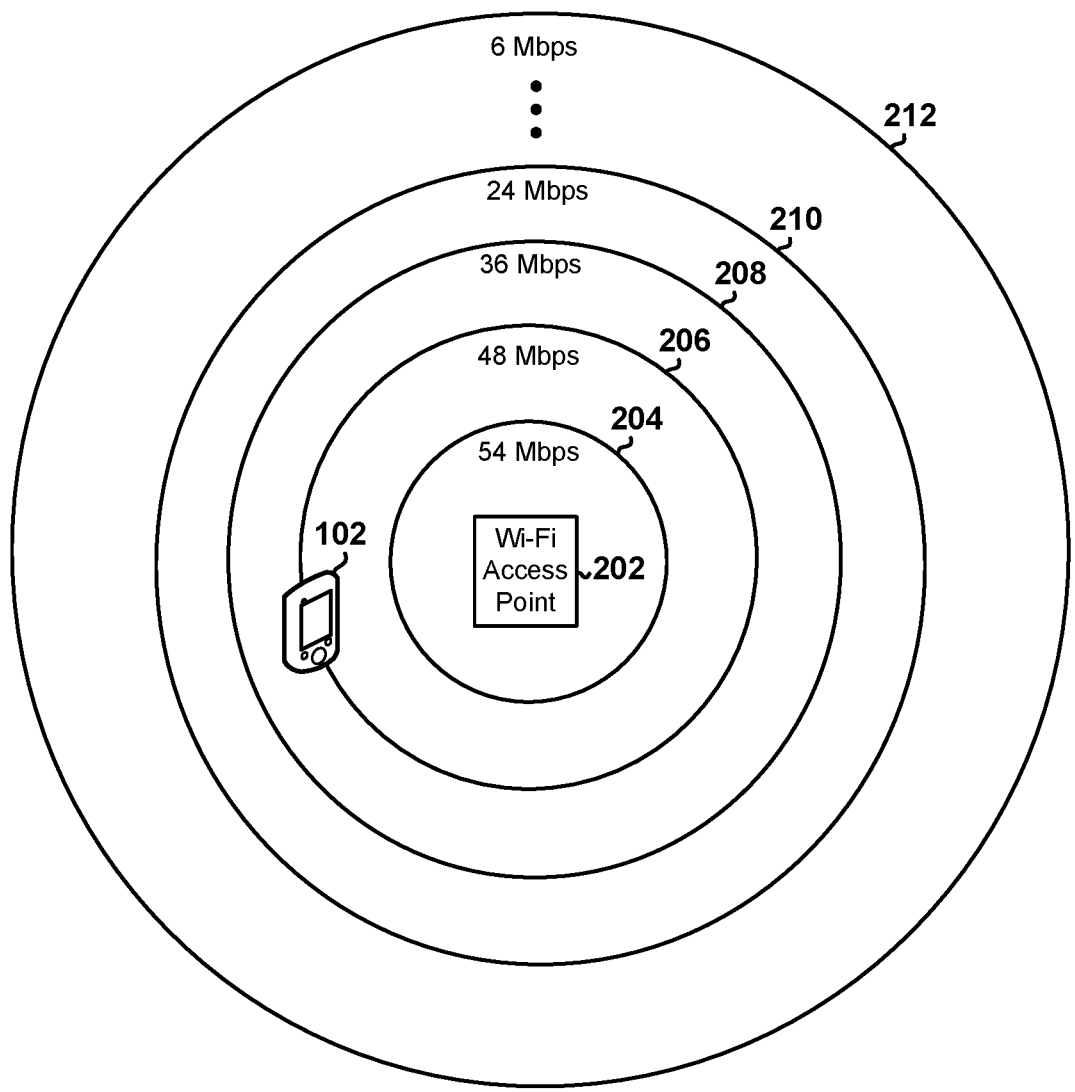
FIG. 2 is an illustration of decreasing link speeds as a user equipment device is positioned at different distances from an access point.

FIG. 2 illustrates that a Wi-Fi access point 202 may provide varying link speeds based on the radio link quality (e.g., signal-to-interference plus noise ratio (SINR), etc.) between the access point 202 and the UE 102 device (wireless device). The radio link quality (and thus link speed) is primarily related to the physical distance between the access point 202 and wireless device. This is illustrated in FIG. 2 via concentric circles 204-212 that identify borders of decreasing link speeds as the wireless device moves further away from the access point 202. As an example of decreasing link speeds, the access point 202 may implement the 802.11g standard/specification having link rates of 54 Mbps, 48 Mbps, 36 Mbps, 24 Mbps, 18 Mbps, 12 Mbps, 9 Mbps, and 6 Mbps.

The effective range of an 802.11g access point at 6 Mbps is much larger than the effective range of higher link speeds. This may result in a situation in which a device automatically connects to a Wi-Fi access point even though the link speed is low. This may in turn result in a poor quality of experience for the customer, subscriber, or user of the wireless device.

If a Wi-Fi access point is provisioned/available to the wireless device, then typically the wireless device will attempt to connect to it regardless of the radio link properties that will be achieved. An example of this occurs where a subscriber's device automatically connects to a Wi-Fi access point in a coffee shop even though the subscriber may only be walking by the coffee shop. This results in data sessions on the wireless device being interrupted. The same result occurs when the wireless device moves from a Wi-Fi network to a cellular network. Another example occurs when a subscriber is connected to a high speed cellular network (e.g., an LTE network) with a high speed data connection, and his/her device is then offloaded to a Wi-Fi access point while in an area with poor Wi-Fi coverage. This may greatly decrease the device's communication and data acquisition speeds and/or otherwise degrade the user experience.

To overcome the above-mentioned limitations of conventional solutions, the various embodiments provide/include a network selection policy server that is configured to inform a wireless device to only transition/connect to an alternative network once a radio link with acceptable properties is obtainable (e.g., when the result of evaluating a condition that tests whether a radio link property is greater than or equal to a threshold value is "true," etc.). In addition, the network selection policy server may give the mobile network operator control over the network selection decisions. For example, the network selection policy server may allow the mobile network operator to specify the acceptable radio link properties (e.g. the minimum link speed, the modulation encoding scheme, the SINR, the RSSI, etc.) that the wireless device should be able to obtain from the alternative network (e.g. Wi-Fi network, etc.) before that device transitions to that network (e.g., before it establishes a communication link to a Wi-Fi network, etc.).

Implementing an embodiment (e.g., via the network selection policy server discussed above) may mean that the wireless device will not connect to a Wi-Fi access point until it is physically closer to the access point, and therefore capable of achieving better radio conditions, which may lead to a higher quality experience for the subscriber or user of the wireless device. This allows the mobile network operator to control how aggressively the wireless device will be offloaded to another network. In the various embodiments, the network selection rules can be provisioned to more or less aggressively offload different subscribers based upon their subscriptions, data usage, the radio access technologies, etc.

Figure 3A:
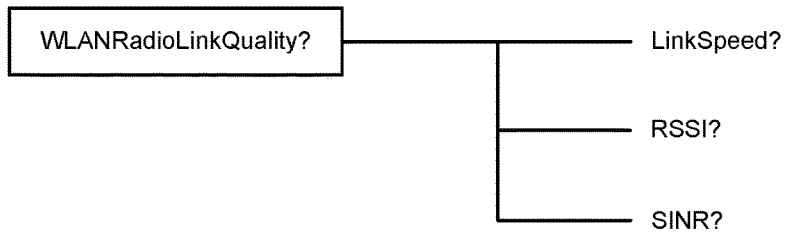
FIGS. 3A and 3B are block diagrams that illustrate modified Open Mobile Alliance Device Management (OMA DM) management objects suitable for use by the various embodiments.

FIG. 3A illustrates that radio link properties may be identified/included in an existing ANDSF management object. For example, in an embodiment in which the network selection policy server is realized as an ANDSF (e.g., ANDSF server 152 illustrated in FIG. 1B, etc.), the required radio link properties may be added into the existing ANDSF Open Mobile Alliance Device Management (OMA DM)

management object. For example, FIG. 3A illustrates that the ANDSF may add, insert, or use optional LinkSpeed, RSSI, and SINR leaves in the optional WLANRadioLinkQuality leaf to identify the required radio link properties or the acceptable radio link properties that the wireless device should be able to obtain before transitioning to another network. Alternatively, the required radio link properties may be included in the policy leaf for inter-system mobility policy (ISMP) and/or in the routing criteria leaf of the ForFlowBased, ForServiceBased, and ForNonSeamlessOffload leaves for inter-system routing policy (ISRP). The required radio link properties may also be incorporated or included in any additional routing criteria, policy or similar leaves that may be introduced into any network selection technologies. In the case that the required radio link properties are being used in one of the leaves mentioned above, then it may be assumed that the criteria applies to the Wi-Fi network to which the rule states a connection should be established.

Figure 3B:
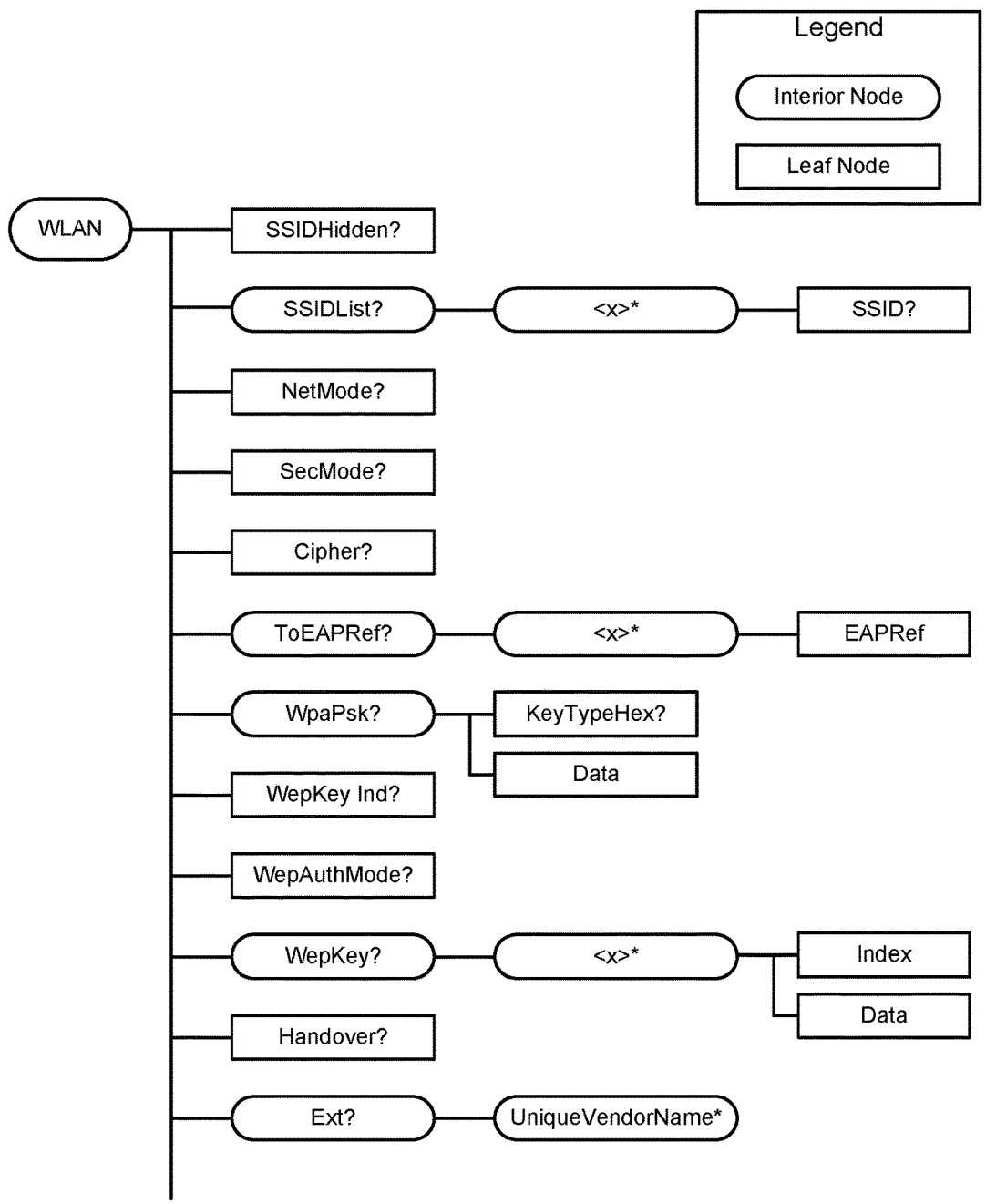

The radio link quality information could also be included in the AccessNetworkInformation leaf of the ANDSF management object. This is a reference to an object with access network type specific information, and in the case of Wi-Fi, may use the management object shown in FIG. 3B. In an alternative embodiment, the radio link quality information could be included in the Ext leaf of the OMA DM management object, which may be used for vendor specific information relating to the ANDSF management objects.

A wireless device may be configured to receive and use enhanced network selection (ENS) rules to make intelligent network selection decisions. The wireless device may also take into account additional metrics, such as whether the access point has Internet connectivity and whether the access point has any backhaul connectivity issues. This may be accomplished by (or this functionality may be supported by) updating the ANDSF management object to take into account the additional information if it is available. For example, Hotspot 2.0 provides this additional information without requiring the user equipment to establish layer-3 connectivity.

Figure 4A:
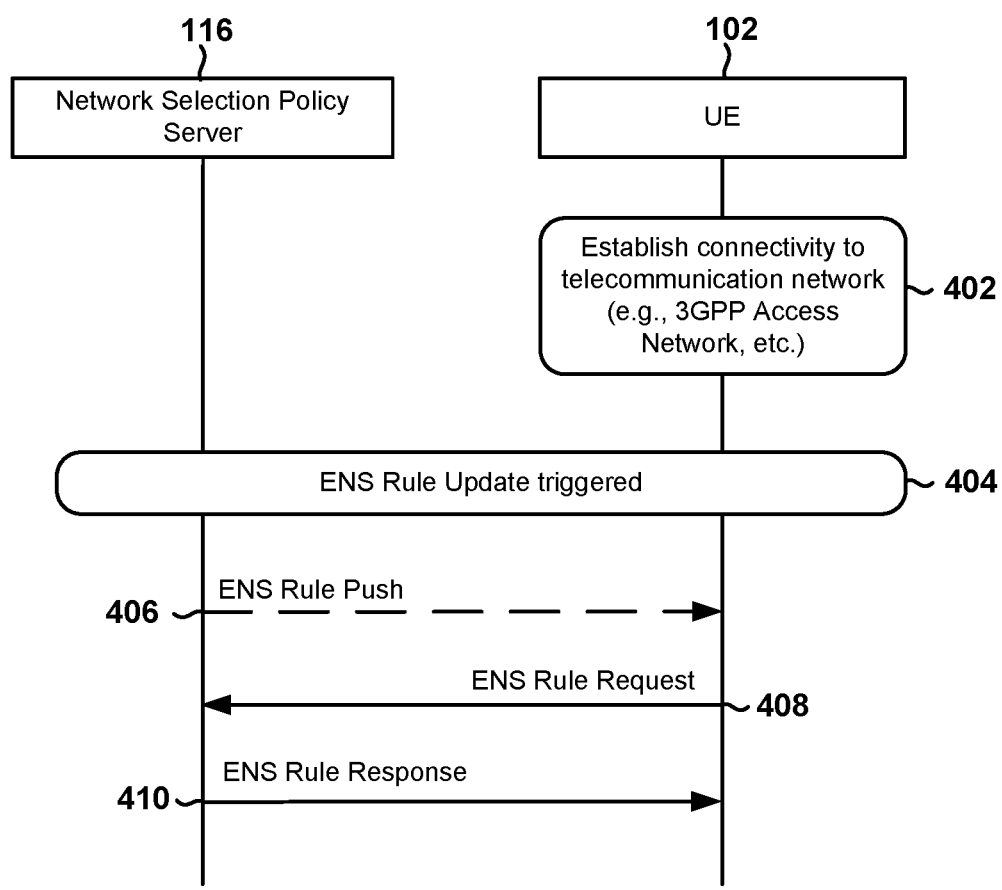
FIG. 4A is a message flow diagram illustrating an embodiment method for communicating enhanced network selection rules that are suitable for causing a user equipment device to make more intelligent network selection decisions.

FIG. 4A illustrates example operations and information flows between a network selection policy server 116 and a user equipment (UE) 102 device for communicating updated enhanced network selection (ENS) rules in accordance with the various embodiments. In operation block 402, the UE 102 may establish connectivity to a telecommunications network (e.g., 3GPP access network, etc.). In operation block 404, the network selection policy server 116 and/or UE 102 device may detect/determine that an ENS rule update has been triggered.

In an embodiment, in response to determining that the ENS rule update has been triggered, the network selection policy server 116 may push ENS rules to the user equipment (UE) 102 in operation 406. Alternatively, in operation 408 the UE 102 device may send an ENS rule request message to the network selection policy server 116, and the network selection policy server 116 may send an ENS rule response message to the UE 102 device in operation 410. The ENS rule response message may include one or more ENS rules, policies, rules or criteria. In an embodiment, one or more of the ENS rules may be an ANDSF rule.

In some embodiments, each of the ENS rules may be associated with a priority value. Alternatively or in addition, an ENS rule may include multiple network selection policies, each of which is associated with a priority value. Further, each network selection policy may include multiple network selection rules, and each network selection rule may be associated with a priority value. In an embodiment, the UE 102 may be configured to receive multiple rules/policies, identify the rule/policy that is applicable, and apply the identified rule/policy. If multiple rules/policies are applicable, the UE 102 may select/apply the rule/policy that is associated with the highest priority value.

Figure 4B:
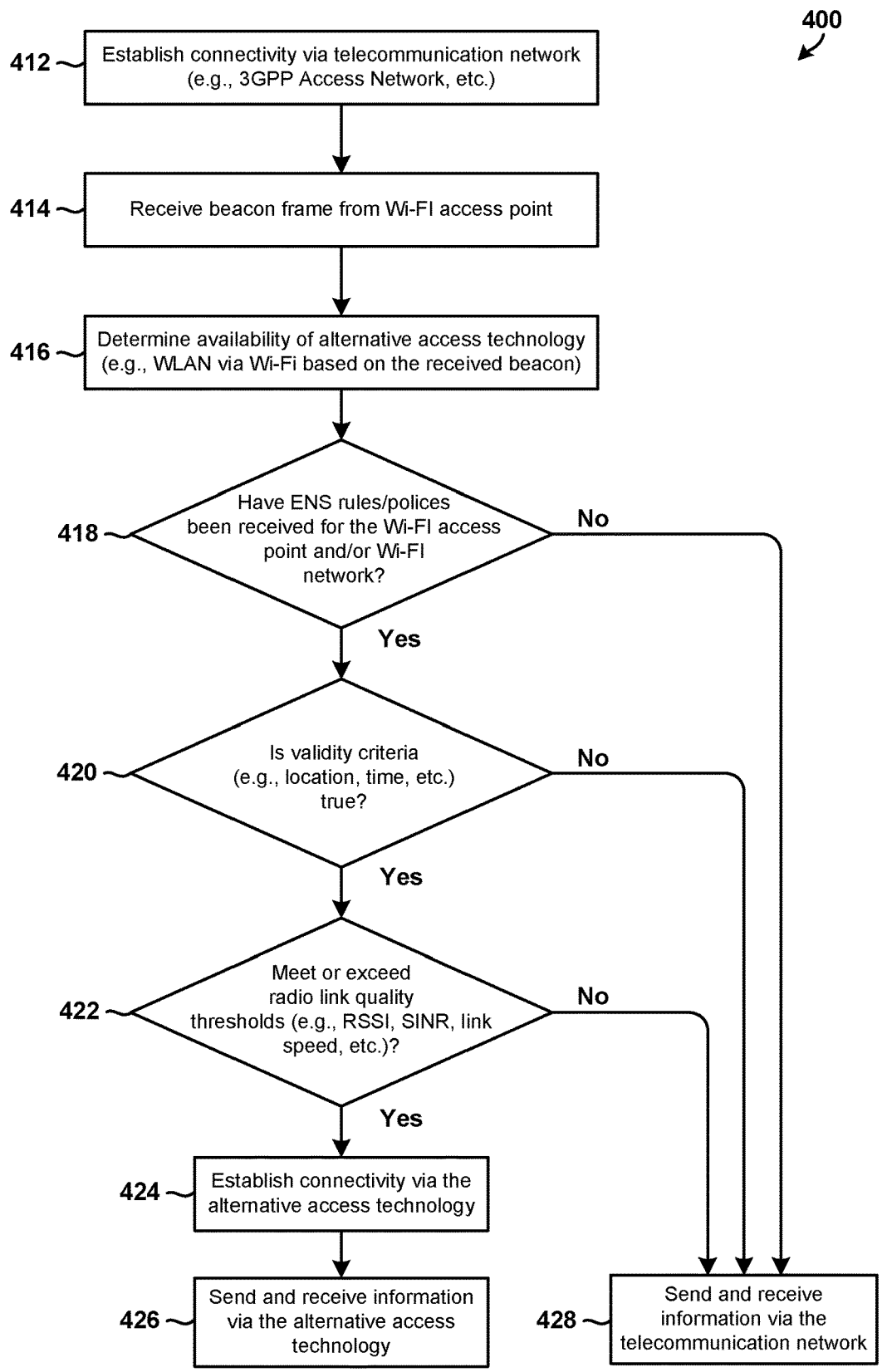
FIG. 4B is a process flow diagram illustrating a method of using enhanced network selection rules to intelligently select a communication network in accordance with the various embodiments.

FIG. 4B illustrates a method 400 of using enhanced network selection (ENS) rules/policies to intelligently determine whether to transition between different wireless communication technologies (e.g., cellular to Wi-Fi, etc.) in accordance with an embodiment. Method 400 may be performed by a processor or processing core in a wireless computing device (e.g., UE 102 illustrated in FIG. 1B).

In block 412, the wireless device may establish wide area network (WAN) connectivity via a telecommunication network (e.g., 3GPP access network, etc.) and begin providing the user access to data and communications via a mobile/cellular telecommunication network. In block 414, the wireless device may receive a beacon frame from a Wi-Fi access point. In block 416, the wireless device processor may determine the availability/accessibility of alternative access technology, such as the availability of a WLAN connection via the Wi-Fi access point based on the received beacon frame. In determination block 418, the wireless device processor may determine whether ENS rules/policies have been received for the Wi-Fi access point or Wi-Fi network.

In response to determining that enhanced network selection (ENS) rules/policies have not been received for the Wi-Fi access point/network (i.e., determination block 418="No"), the wireless device processor may discard or disregard the beacon frame and continue sending/receiving information via the telecommunication network in block 428. In response to determining that ENS rules/policies have been received for the Wi-Fi access point/network (i.e., determination block 418="Yes"), in determination block 420 the wireless device processor may determine whether various validity criteria (e.g., location, lag time, etc.) are valid/true. In an embodiment, the wireless device processor may be configured to determine the validity criteria that are to be tested based on the information included in the received ENS rules/policies.

In response to determining that the validity criteria are not valid/true (i.e., determination block 420="No"), the wireless device processor may continue sending/receiving information via the telecommunication network in block 428. In response to determining that the validity criteria are valid/true (i.e., determination block 420="Yes"), the wireless device processor may determine whether the radio link quality thresholds have been met (e.g., equaled or exceeded) in determination block 422. In an embodiment, the wireless device processor may be configured to determine the radio link quality thresholds, values, properties, etc. that are to be used or evaluated in block 422 based on the information included in the received ENS rules/policies.

In response to determining that the radio link quality thresholds have not been met (i.e., determination block 422="No"), the wireless device processor may continue sending and receiving information via the telecommunication network in block 428. In response to determining that radio link quality thresholds have been met (i.e., determination block 422="Yes"), in block 424 the wireless device processor may establish WLAN connectivity via the alternative access technology (e.g., WLAN via Wi-Fi, etc.). In block 426, the wireless device processor may begin sending/receiving information via the alternative access technology (e.g., via the Wi-Fi network).

As mentioned above, the rules may be prioritized and/or each rule may be associated with a priority value. For example, the network selection policy server may send the wireless device ten rules that are each associated with a unique priority value (e.g., 10 through to 1). In this case, the wireless device processor may evaluate each of these rules to determine whether they are applicable, and apply only the rules that are determined to be applicable. If two or more rules are determined to be applicable and incompatible/exclusive, the wireless device processor may apply the rule that is associated with the highest priority value (e.g., in block 424).

Typically, a wireless device continually scans for available Wi-Fi access points and attempts to connect to any Wi-Fi access point to which it has previously been connected. This connection typically occurs as soon as the wireless device receives a beacon frame from the access point (i.e. as soon as it comes into range of the access point).

A conventional wireless device will connect to any Wi-Fi access point for which it has active and valid network selection rules, with little consideration of the radio link quality or the amount of time the user equipment has been in the coverage area of the access point. This can be a problem as the user equipment will connect even when at the outer limits of the access points' range, resulting in a poor quality connection that could degrade the user's experience (e.g., due to slow or unreliable communications, etc.) and/or degrade the connections of the other devices that are currently using the access point. This may be particularly problematic if the user equipment is only in range of the access point for a limited period of time, such as when walking through the coverage area of the access point. This, in turn, may cause all active data sessions to be interrupted as the user equipment attempts to route data traffic via the Wi-Fi network. However, if the subscriber is simply walking past the access point then there is insufficient time for the user equipment to fully establish a connection with the Wi-Fi access point. Even if a connection is established successfully, the amount of time that the subscriber is in coverage of the Wi-Fi network may be minimal, and the data session will be interrupted again when the subscriber leaves the coverage area and a cellular data connection must be re-established. These limitations of conventional solutions may result in a very poor user experience due to continually interrupted connections and increased signaling load on the network.

Various embodiments may overcome the above-mentioned limitations of conventional solutions by adding lag time (e.g., via a lag time value, etc.) to the network selection policy server rules/policies. The embodiments allow a mobile network operator to specify a time threshold for each network offload policy that would prevent the user equipment from connecting to an access point until the user equipment has been in the coverage area for longer than the defined threshold. This may prevent undesired Wi-Fi offload decisions during periods of relatively high mobility, thereby improving the subscriber's quality of experience and reducing unnecessary signaling.

The lag time value may be associated with the user equipment being in the coverage area of the Wi-Fi access point. Thus, a timer may be started when the beacon is first detected. The presence of the beacon frame may be continuously or periodically monitored, e.g., by receiving updates from the passive or active scanning being performed by the user equipment. If the beacon is not detected in one of the scans, then the timer may be stopped and discarded. The timer may be reset and restarted if the beacon is detected again. When the timer expires, the lag time validity criterion is satisfied, and if the other network selection criteria are also valid, the user equipment may proceed to connect to the access point.

In another embodiment, the lag time may be associated with radio link quality based offload decisions. In this embodiment, the timer is started when the beacon is received and the associated radio link quality metric exceeds the defined thresholds. The beacon frame is then continuously or periodically monitored. The timer may be stopped and discarded if the beacon is no longer present or the associated radio link quality metric does not exceed the defined threshold. The timer may be reset and restarted if the beacon is detected again and the radio link metrics are above the threshold.

The various embodiments include a network selection policy server configured so as to give mobile network operators more control over device network selection behavior, which may include offloading, onloading and other network selection capabilities discussed in this application or known in the art, such as device-to-device connections, etc. When combined with the radio link quality based decisions (e.g., offloading/onloading decisions, etc.), the various embodiments provide the mobile network operators with highly granular controls over these and other device network selection behaviors.

Figure 5:
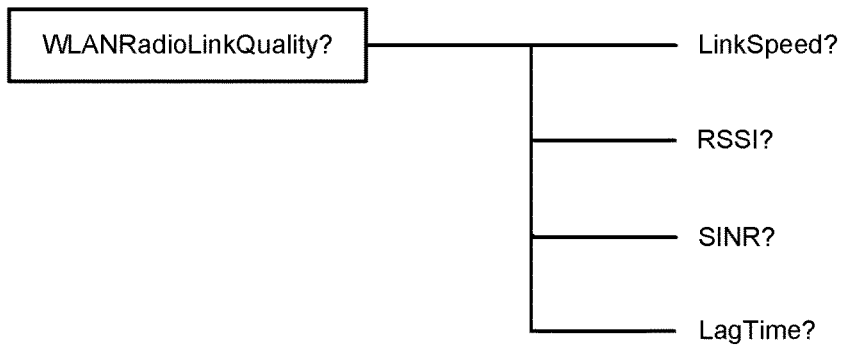
FIG. 5 shows modifications that may be made to the OMA DM management objects in the various embodiments incorporating a lag time.

In an embodiment in which the network selection policy server is realized as an ANDSF server, a lag time value may be added to the ANDSF management object and the client on the user equipment correspondingly updated. For example, a LagTime parameter could be used as a standalone value associated with connecting to a specific Wi-Fi access point. Alternatively, a lag time value could be included in the previously described optional WLANRadioLinkQuality leaf, as shown in FIG. 5. In either case, a lag time value may be included in the policy leaf for ISMP and in the routing criteria leaf of the ForFlowBased, ForServiceBased, and ForNonSeamlessOffload leaves for ISRP. Indeed, a lag time value may be incorporated into any additional routing criteria, policy or similar leaves that may be introduced into any network selection technologies. In the case that a lag time value is being used in one of the leaves mentioned above, the device may use/apply this criteria to the Wi-Fi network to which the rule states a connection should be established.

The lag time information could also be included in the AccessNetworkInformation leaf of the ANDSF management object. In an alternative embodiment, the lag time information could be included in the Ext leaf of the OMA DM management object, which can be used for vendor specific information relating to the ANDSF management objects.

Using conventional solutions, network selection decisions made via a network component (e.g., a network selection policy server, etc.) do not incorporate cellular network radio link conditions. This means that decisions are simply based upon the presence of specific Wi-Fi access points and the current cell to which the user equipment is attached. For example, a network selection rule may instruct a user equipment not to connect to a specific Wi-Fi access point when it is connected to a specific cell. However, this does not take into account the radio link quality between the user equipment and the cell. Therefore, the user equipment may be in an excellent coverage area of the Wi-Fi access point, but it may have very poor connectivity to the cellular network, and yet it will not select the Wi-Fi network. In this case the user equipment could achieve much higher quality connectivity and reduce cellular network load by switching to the Wi-Fi access point.

The various embodiments may enable cellular network radio link properties and conditions to be included in Wi-Fi network selection decisions by introducing cellular radio threshold metrics as validity criteria to network selection rules. This allows a rule to be enforced based upon whether the current connection radio link metrics to the cellular network equal or exceed specific radio link properties defined as part of that rule.

The various embodiments may use any of a number of cellular network radio link properties to determine the radio link quality between the user equipment and cellular network. The radio link properties may include, but are not limited to, the signal strength measured by the user equipment in dBm (dBmW), the signal-to-noise ratio (SNR), the arbitrary strength unit (ASU), etc. The dBm value may be a representation of the absolute power measured by the user equipment in Watts and converted to dBm. The SNR may be a metric representing the ratio comparing the received signal strength to the noise floor. ASU is primarily used on Android® handsets, and may be an integer value that represents the signal strength. In GSM networks, ASU may be equal to the received signal strength indication (RSSI). In UMTS networks, ASU may be equal to the received signal code power (RSCP).

Figure 6:
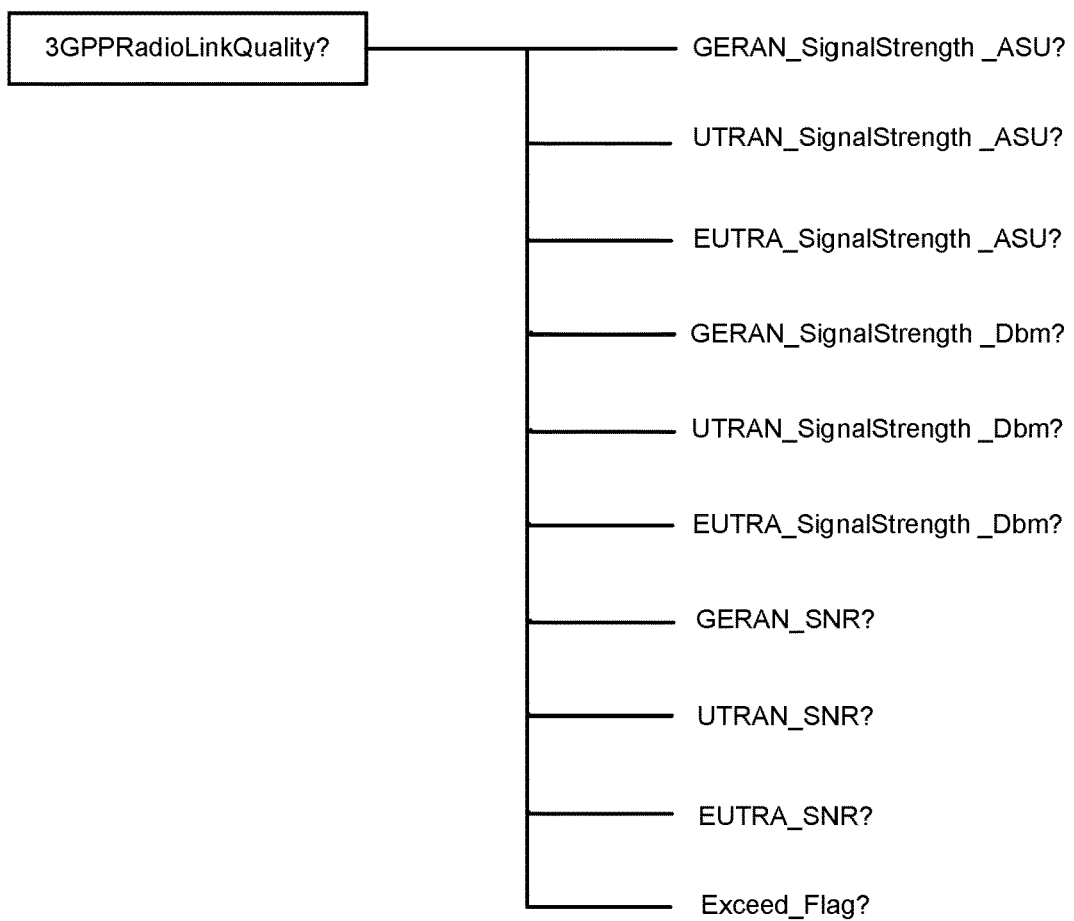
FIG. 6 shows modifications that may be made to OMA DM management objects in the various embodiments incorporating cellular network radio link metrics.

In an embodiment in which the network selection policy server is realized as an ANDSF server, the required cellular network radio link properties may be added into the existing ANDSF Open Mobile Alliance Device Management (OMA DM) management object. FIG. 6 shows modifications that may be made to a management object in order to incorporate cellular network radio link properties. The values associated with these leaves represent threshold values that must be exceeded by the user equipment measurements in order for the rule to be marked as valid. This parameter could be used as a standalone value associated with connecting to a specific Wi-Fi access point. This parameter may be included in the policy leaf for ISMP and in the routing criteria leaf of the ForFlowBased, ForServiceBased, and ForNonSeamlessOffload leaves for ISRP. This parameter may also be incorporated into any additional routing criteria, policy or similar leaves that may be introduced into any network selection technologies. In an alternative embodiment, the cellular network radio link information could be included in the Ext leaf of the OMA DM management object which can be used for vendor specific information relating to the ANDSF management objects.

As shown in FIG. 6, optional ASU, SNR, and dBm values are provided for three different access network types (i.e. GERAN, UTRAN, and EUTRAN). The mobile network operator can use one parameter per access network type, multiple parameters per access network type, or populate some parameters for only a single access network type. The Exceed_Flag may be a binary value that is suitable for determining whether the measured value must be greater or less than the threshold value in order for device to consider the criteria as true/valid. For example, if the Exceed_Flag is false, then the measured value must be below the threshold for the criteria to be true. Conversely, if the Exceed_Flag is true then the measured value must be equal to, or exceed, the threshold for the criteria to be true. In an embodiment, if one of the values is provided for the access network type by which the user equipment is currently connected, then the validity criteria may be considered when applying the rule. If no value is provided for the access technology by which the user equipment is currently connected, then the validity criteria may be ignored.

If a value is provided, then the current metric measured by the user equipment may be compared to the provisioned threshold, and depending on the Exceed_Flag value, it may be either above or below the threshold in order for the validity criteria to be satisfied. If multiple values are provided for a single access network type, then the validity criteria may be determined to be satisfied if any/all of the measured radio values exceed the defined threshold parameters.

In some embodiments, the components may be configured to use a cellular network radio link condition rule as part of a network selection decision. In this example, the user equipment only connects to the Wi-Fi network if the quality of the radio link between the user equipment and the cellular network is below the pre-defined threshold. This could occur in a scenario in which a user equipment device is connected to an LTE network and achieving high data rates and excellent quality of service in an uncongested cell. Offloading this device to Wi-Fi network may be undesirable. If, however, the user equipment device has a low signal strength to the cellular network, then it may achieve higher quality by moving to the Wi-Fi network.

The various embodiments may give mobile network operators more control over device offload behavior. When combined with the radio link quality based offload decisions and the lag time based offload decisions, the various embodiments may give the mobile network operators highly granular control over device offload behavior.

The various embodiments may enable the network selection policy server to provide differentiated policies based upon device specific information such as the wireless device manufacturer, model, unique identifier (e.g., International Mobile Station Equipment Identity (IMEI)), operating system version, and if the wireless device has been tampered with.

In an embodiment in which the network selection policy server is realized as an ANDSF server, the wireless device specific information can be implemented as part of the session initialization signaling between the wireless device and server. For example, the wireless device can send device and operating system information as part of the UE_Profile leaf. As currently defined in ANDSF, the wireless device sends an operating system identifier and device capability information (e.g., IRSP capability). This additional information could also be provided in the Ext leaf of the ANDSF management object instead of in the UE_Profile leaf.

This device specific information can be added in a number of places within the ANDSF management object, such as in the UE Location or Ext nodes. In an embodiment, the UE_Profile leaf may incorporate additional useful information. For example, the wireless device may send the IMEI, and the network selection policy server may then use this to determine the wireless device type (i.e. the manufacturer and model). Alternatively, the wireless device could also send the manufacturer and model over a separate interface (e.g., S14) as an alternative to the network selection policy server having to look this up using the IMEI. The wireless device could also determine information such as whether the user has tampered with the wireless device in an unintended manner (e.g., to obtain elevated privileges by "rooting", "sideloading", or "jail breaking" the wireless device), and provide this information to the network selection policy server. This information can then be used to determine the polices that will be sent to the wireless device.

An example of how enabling the network selection policy server to provide differentiated policies based upon device specific information is advantageous occurs in scenarios in which the mobile network operator requires different devices to be treated differently, e.g., offloading 3G devices that consume large amounts of data more aggressively while offloading LTE capable devices less aggressively, etc. Another example occurs in scenarios in which the mobile network operator wants to treat a specific device, group of devices, or devices with a specific operating system version in a specific way because they are causing network problems. In another example, mobile network operators may want to treat machine-to-machine (M2M) devices in a different manner to smart phone devices. As a final example, mobile network operators may want to provide differentiated policies based on whether the subscriber is currently connected using the mobile network operator provided device. If the subscriber has placed his/her Subscriber Identity Module (SIM) in a non-operator provided wireless device, then the IMEI provided by the wireless device will not match the IMEI known by the mobile network operator. The network selection policy server could then decide not to allow the wireless device to use Wi-Fi networks, or deliver a restricted set of network selection policies. The same principle may be applied to a tampered device. If the wireless device is capable of determining that it is tampered, then this information may be sent to the network selection policy server, and the network selection policy server may treat the tampered wireless device in a specific manner.

In an embodiment, the network selection policy server may send device-specific rules to the wireless device for use as part of its network selection decision. In this embodiment, the user equipment provides its IMEI to the network selection policy server (e.g., ANDSF server). The server uses the IMEI to determine if the wireless device is the same as the wireless device that was provided by the mobile network operator, and to determine whether the specific wireless device type is required to be issued with specific network selection policies. The first 8-digits of the IMEI provide a reference to the model and manufacturer, and this information is available in databases such as the IMEI database provided by the GSMA.

Figure 7:
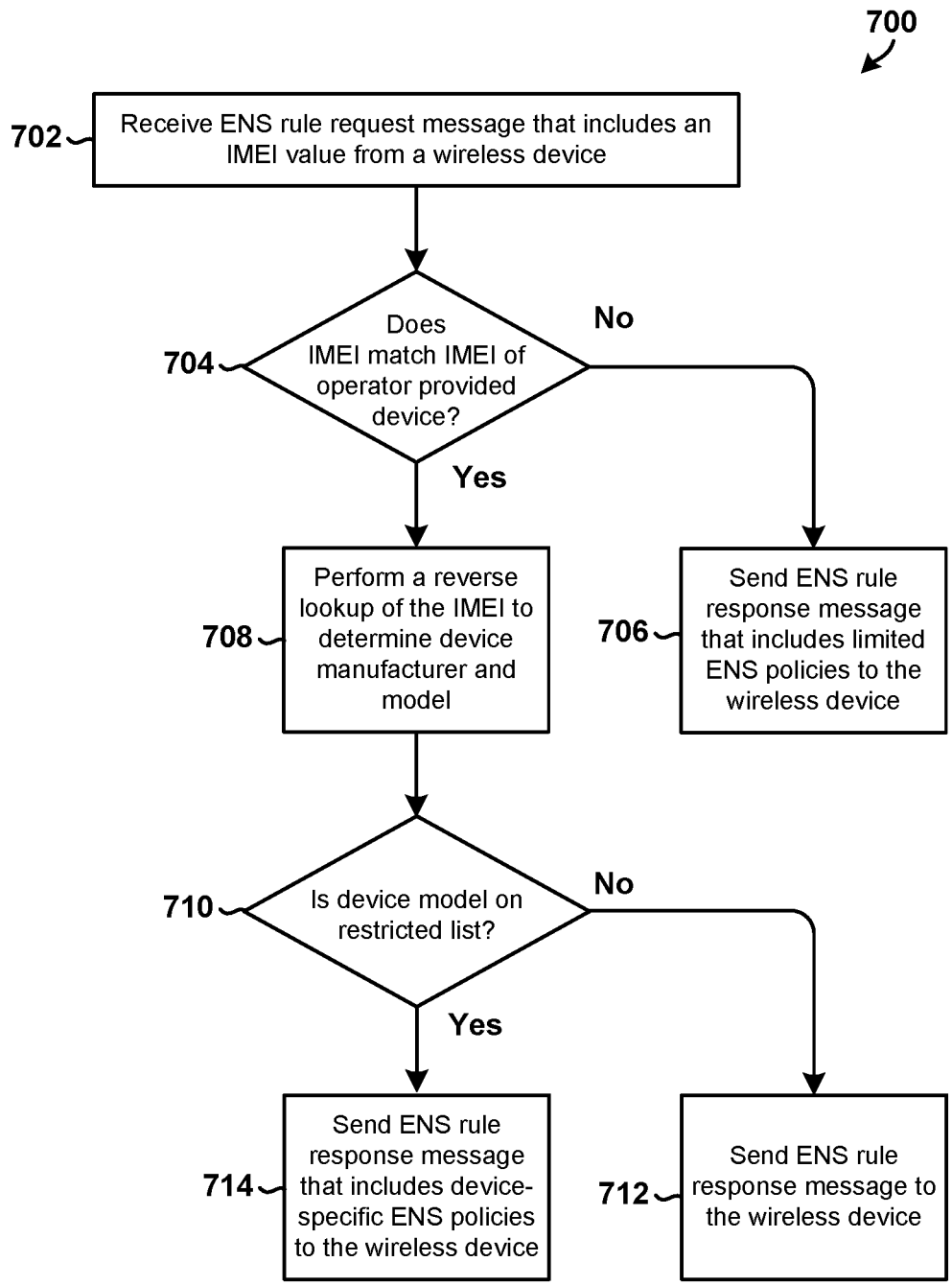
FIG. 7 is a process flow diagram illustrating a method of intelligently determining whether to use device-specific network selection rules to intelligently select a communication network in accordance with an embodiment.

FIG. 7 illustrates a method 700 for intelligently determining whether to send a wireless device a device-specific rule for use as part of its network selection decision/determination. Method 700 may be performed by a processor or processing core in a computing device that includes/implements all or portions of the network selection policy server. In block 702, the processor may receive an ENS Rule Request message from a wireless device. The ENS Rule Request message may include location information, profile information, and an international mobile station equipment identity (IMEI) value.

In determination block 704, the processor may determine whether the received IMEI value matches an IMEI value of an operator-provided device. In response to determining that the received IMEI value does not match an IMEI value of an operator-provided device (i.e., determination block 704="No"), the processor may generate and send an ENS Rule Response message that includes limited ENS rules/policies to the wireless device in block 706. In response to determining that the received IMEI value matches an IMEI value of an operator-provided device (i.e., determination block 704="Yes"), the processor may perform a lookup of the received IMEI value to determine the device manufacturer and/or model of the wireless device.

In determination block 710, the processor may determine whether the device model is included in a restricted device list. In response to determining that the device model is not included in the restricted device list (i.e., determination block 710="No"), the processor may generate and send an ENS Rule Response message that includes ENS rules/policies to the wireless device in block 712. In response to determining that the device model is included in the restricted device list (i.e., determination block 710="Yes"), the processor may generate and send an ENS Rule Response message that includes device-specific ENS rules/policies to the wireless device in block 714.

The various embodiments may enable the network selection policy server to provide differentiated policies based upon application state and contextual information, such as if a specific application is streaming audio or video, and which applications are currently not running, being run in the foreground, and being run in the background. Contextual information may include information relating to services and daemons that are running on the user equipment. In a scenario in which an application running on the user equipment is actively streaming audio or video, it may be desirable not to offload to a Wi-Fi network in order to prevent the application from being interrupted or stopped when the user equipment is offloaded. Similarly, in a scenario in which an instant messaging chat application is running in the foreground of the user equipment, it may be desirable not to offload to a Wi-Fi network in order to prevent the instant messaging chat application from being interrupted when the user equipment is offloaded. In both of these scenarios, an offload to a Wi-Fi network could degrade the user experience.

In an enhanced embodiment, a user equipment device may be configured to make a network selection decision based upon the network resource requirements of one or more applications that are running on it. This may facilitate applications to use the optimal network for their data traffic requirements, which in turn may result in a better network experience for the subscribers, as well as allowing mobile network operators to reduce unwanted traffic on their networks. The network selection policy server may create policies containing criteria based upon one or more of the application connection frequency; bandwidth usage (uplink and/or downlink); traffic type; protocol type(s); number of connections per time period (e.g., minute, hour, day); maximum, minimum, or average data consumption; length of session; and rule type. The user equipment may then classify application usage, and based upon the classification, make a network selection decision. In various embodiments, the user equipment device may be configured to accomplish this by using any combination of embedded device/radio logic, driver software, operating system software, and client software. This application classification may be performed dynamically so the user equipment keeps track of the applications' behavior.

In another enhanced embodiment, the network selection policy server may create policies containing criteria based upon the network type, or the actual network, with which the user equipment is exchanging the most data traffic. This may reduce the amount of data traffic that needs to leave the network and traverse intermediate networks, and thus it may improve network capacity and reduce the mobile network operator's inter-network costs. For example, in a scenario in which the user equipment is exchanging significant amounts of data traffic with another user equipment in the same network (e.g., a VoIP call between two subscribers of the same mobile network operator), it may be desirable not to offload to a Wi-Fi network in order to prevent the data traffic from leaving the mobile network operator's network. Similarly, in a scenario in which the user equipment is exchanging significant amounts of data traffic with a server on a local network (e.g., an enterprise server within a business), it may be desirable to offload to a Wi-Fi network in order to keep the data traffic within the business's local network.

Figure 8:
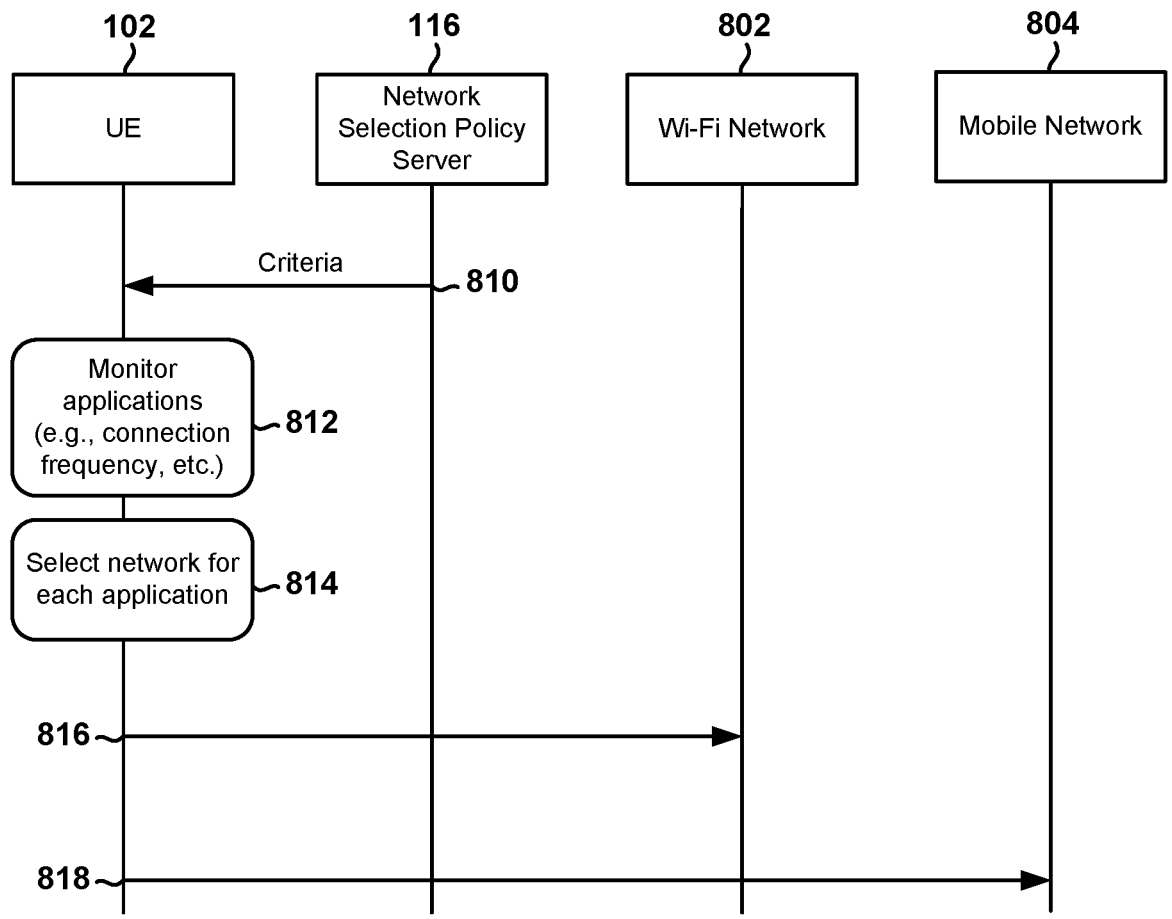
FIG. 8 is a message flow diagram illustrating an embodiment method of intelligently offloading select application traffic to alternative communication networks in accordance with an embodiment.

FIG. 8 is a message flow diagram illustrating an embodiment method corresponding to a client running on a user equipment using application information as part of a network selection decision. In operation 810, the network selection policy server 116 may send a set of criteria to the UE 102. For example, the network selection policy server 116 may send ENS rules that include criteria suitable for indicating that applications that connect to the network more frequently than once every five minutes should be offloaded to a Wi-Fi network. In operation block 812, the UE 102 may monitor the running applications based on the criteria, such as to determine whether some applications connect more frequently than once every five minutes. In operation block 814, the UE 102 may determine/select a network for sending select application traffic (e.g., based on whether the applications meet or exceed the criteria, etc.). The user equipment may also take into consideration additional factors, such as the current network load, when determining/selecting the network to use for sending the applications' traffic.

In operation 816, the UE 102 may transition the traffic associated with some of the applications to the Wi-Fi network 802. In operation 818, the UE 102 may transition or maintain the remaining traffic on the mobile network 804. In an embodiment, the user equipment may build a profile of applications so that when an application starts it is placed on a certain network based on its past behavior. The UE 102 may continue to monitor the application, and if its behavior changes then its traffic can be sent and received using a different network.

In an embodiment in which the network selection policy server is realized as an ANDSF server, the application state and contextual information rules may be added to the ANDSF management object, and the client on the user equipment correspondingly updated. There are a number of places within the management object tree where this information could be added. For example, the application state and contextual information rules could be added as an additional leaf to the ISMP rules. Alternatively, the application state and contextual information rules could be included in the optional routing criteria leaf for ISRP. In an alternative embodiment, the application state and contextual information could be included in the Ext leaf of the OMA DM management object which can be used for vendor specific information relating to the ANDSF management objects.

The various embodiments may enable the network selection policy server to dynamically create Wi-Fi network selection policies based on temporary and rapidly changing information, such as user equipment measurement feedback, and information obtained from core network components (e.g., policy management system, charging system, subscriber management system).

Figure 9:
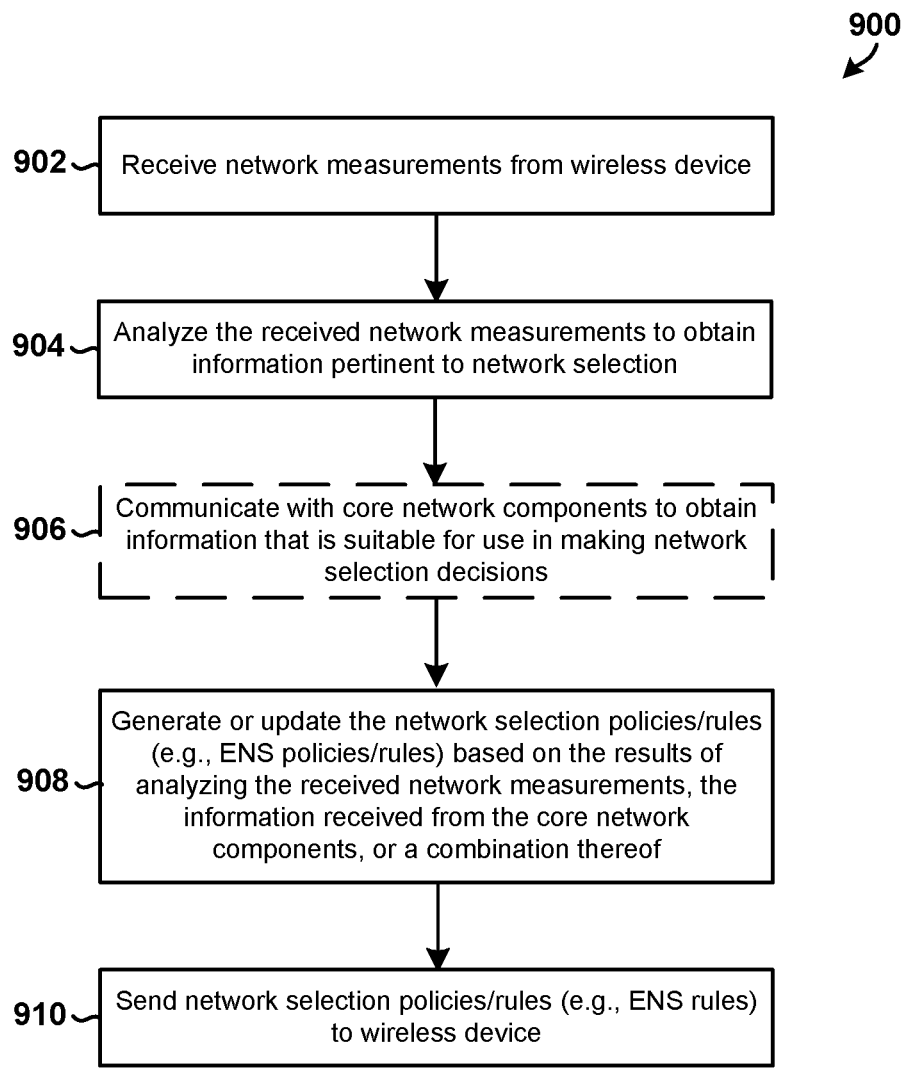
FIG. 9 is a is a process flow diagram illustrating an embodiment method of using information received from network components to generate enhanced network selection rules suitable for causing a wireless device to intelligently transition between communication networks.

FIG. 9 illustrates a method 900 of dynamically creating network selection rules/policies in accordance with an embodiment. Method 900 may be performed by a processor or processing core in a computing device that includes/implements all or portions of the network selection policy server. A wireless device may be configured to make network measurements (e.g., Wi-Fi network measurements) and periodically transmit them to the network selection policy server. In block 902, the processor may receive network measurements from the wireless device. In block 904, the processor may analyze the received network measurements to obtain information pertinent to network selection.

In optional block 906, the processor may communicate with core network components (e.g., policy system, charging system, etc.) to obtain information that is suitable for making network selection decisions, such as information on network utilization on a per cell and/or per subscriber basis. In block 908, the processor may generate or update the network selection policies/ruled (e.g., ENS policies/rules) based on any combination of the information obtained from the wireless device (e.g., network measurements and other feedback), the results of analyzing the received network measurements, and the information received from core network components. In block 910, the processor may send the generated/updated rules/policies to the wireless device, which may be accomplished via a push operation or as a response to the next network selection rule/policy request message received from the wireless device.

As previously noted, the user equipment may make Wi-Fi network measurements and periodically transmit them to the network selection policy server in order for it to dynamically create Wi-Fi network selection policies. These measurements may include: the access point's identity; the user equipment's location, the offload volume, application usage statistics, time on Wi-Fi, Wi-Fi signal quality, throughput, goodput, retransmissions, backoffs, connectivity issues, retransmissions, and application specific parameters.

The access point's identity (e.g., SSID, MAC) may uniquely identify the access point to which the user equipment is connected. This information can be provided for all access points that the user equipment connects to, although in some circumstances it may need to be restricted to specific types of access points (e.g., ANDSF provisioned access points) in order to comply with subscriber data protection requirements.

The user equipment's location can include the GPS co-ordinates of the user equipment when it is connected to a Wi-Fi network and/or cellular network. It can also include the cellular network location (e.g., Cell ID, LAC, TAC) to which the user equipment was connected when it was offloaded to a Wi-Fi network.

The offload volume measurement may represent the volume of data transmitted (i.e., uploaded and/or downloaded) over the Wi-Fi and cellular networks. This information may be provided on a per access point granularity.

The application usage statistics may represent the volume of data transmitted (i.e., uploaded and/or downloaded) over the Wi-Fi and cellular networks on a per application and per access point basis.

The time on Wi-Fi measurement may represent the total amount of time that the user equipment is or was using a specific Wi-Fi network and/or access point.

The Wi-Fi signal quality measurement (e.g., RSSI, ASU, SNR and Link Speed) may represent the signal quality between the user equipment and the Wi-Fi network. The user equipment may continually measure the signal quality. This information can be used to gauge subscriber experience and identify problematic access points. For example, if the mean link speed of user equipments connected to an access point is low then it is likely that the access point is poorly located.

The goodput measurement may represent the average goodput and/or throughput of the user equipment during active transmit and receive periods.

The retransmissions measurement may represent a number (e.g., mean, maximum, minimum) of MAC layer retransmissions. This may be a good indication of the amount of contention occurring at the access point.

The backoffs measurement may represent a number (e.g., mean, maximum, minimum) of medium backoffs, and it may be measured using the Network Allocation Vector (NAV). This may be a good indication of how many user equipments are contending for the medium, and how much congestion this is causing.

The connectivity issues measurement may report any issues related to Internet connectivity and/or access point connectivity (e.g., intermittent connectivity, connectivity failure).

The retransmissions measurement may represent the number of transmissions (e.g. TCP retransmissions), and it may give an indication of the number of lost packets.

The application specific parameters may include jitter, packet loss, end-to-end delay, and codec adaptation on a per application basis. They may be used to determine the subscriber's quality of service.

In an embodiment in which the network selection policy server is realized as an ANDSF server, the Wi-Fi network measurements can be implemented as part of an optional WLANDeviceMeasurements leaf. This leaf may be populated when the user equipment connects to a Wi-Fi access point. The user equipment then continually or periodically records the required Wi-Fi network measurements. The gathered measurements may be analyzed when the user equipment disconnects from the access point, and then sent to the network selection policy server. This may enable a reduction in the amount of information sent to the network selection policy server (e.g., by only sending the average, maximum, and minimum signal strength measurements instead of sending all measurements).

The Wi-Fi network measurements may give mobile network operators access to information that was previously unavailable, and analysis of this information may provide greater visibility and insight into their Wi-Fi networks and their subscribers' offload behavior.

The information and analysis may enable mobile network operators to identify problematic access points by analyzing the signal strength, SNR and link speed, provided by a large number of user equipments. For example, if the average link speed achieved by user equipments connected to an access point is low, then this may indicate that the access point is poorly located.

The information and analysis may enable mobile network operators to understand subscribers' data consumption habits when they are connected to Wi-Fi networks versus cellular networks. This may be achieved by analyzing subscriber data and application data (on a per subscriber and/or per application basis), without requiring complex hardware (e.g., DPIs) to be deployed in the Wi-Fi network. It is also possible that interesting or unusual trends may be identified on a per access point basis.

The information and analysis may enable mobile network operators to identify areas and locations in which a large number of subscribers are connecting to Wi-Fi networks, but where the mobile network operator has no Wi-Fi access points. This may be possible because the user equipment may provide feedback about all Wi-Fi networks that it connects to, rather than just mobile network operator's Wi-Fi network.

As previously noted, the network selection policy server may use information obtained from core network components in order for it to dynamically create Wi-Fi network selection policies. Integration with other network components is important in providing coordinated policy control and network selection across multiple different network types, and in providing dynamic network selection policies. This may enable a mobile network operator to integrate Wi-Fi offload decisions with other information (e.g., subscriber and plan information, current credit and top-up information, core network policy decisions, data usage) in order to create per subscriber and/or per access point network selection policies.

Figure 10:
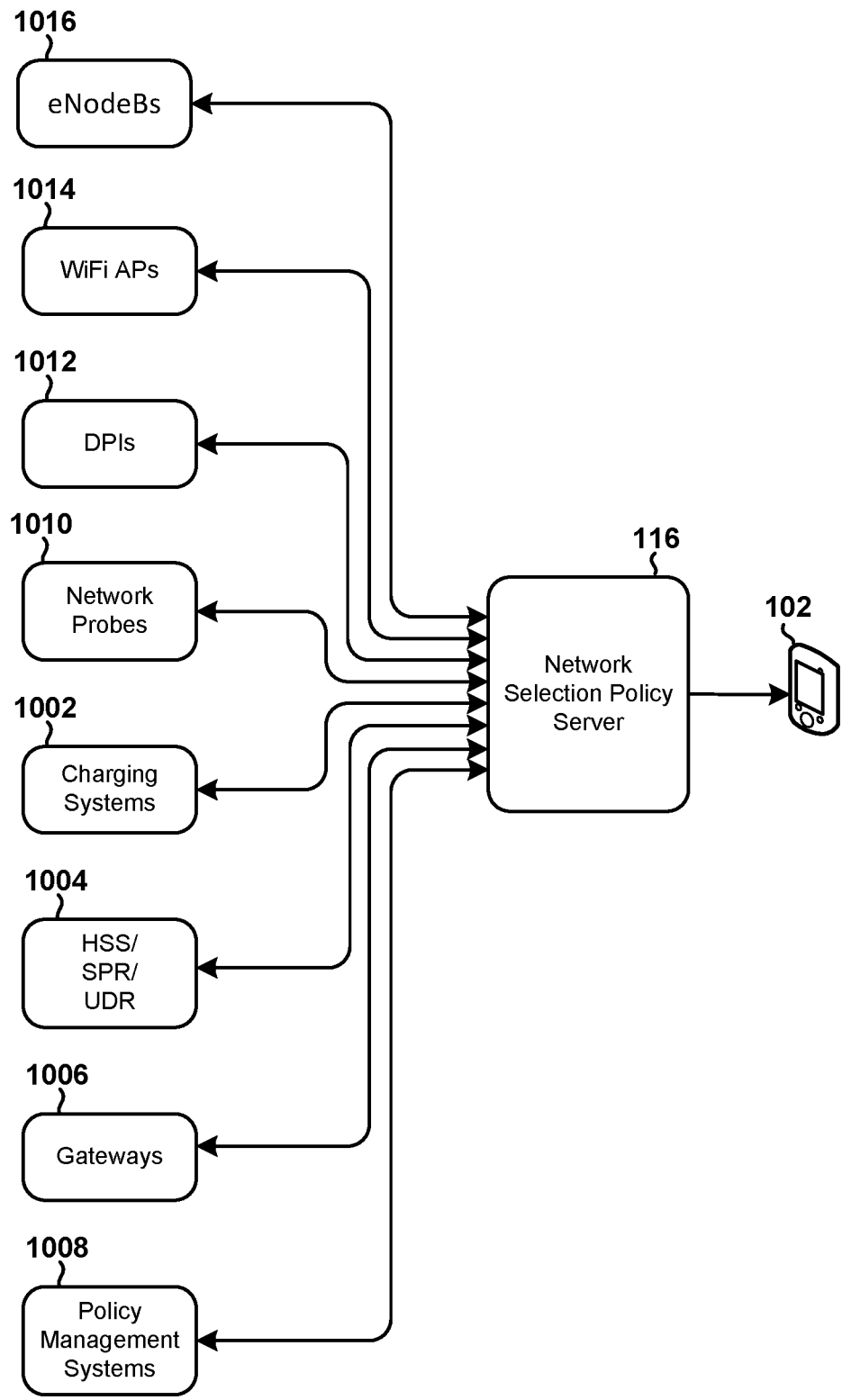
FIG. 10 is a system block diagram illustrating various network core components that could send the information that is used to generate the enhanced network selection rules in various embodiments.

FIG. 10 is an architectural drawing showing an example architecture containing a network selection policy server 116 arranged to communicate with core network components. In an alternative architecture, the network selection policy server 116 may be integrated into one or more of the core network components. The network selection policy server 116 may be configured obtain information from UEs 102 (as previously described), charging systems 1002 (e.g., overall data consumption, breakdown of data used, cost to the subscriber, usage on different networks), subscriber management systems 1004, gateways 1006 (e.g., usage information, number of sessions, applications used, per applications data usage), policy management systems 1008, network probes 1010 (e.g., congested cells, active users), deep packet inspectors (DPIs) 1004, Wi-Fi access points 1014, eNodeBs 1016, and any other network component with relevant information (e.g., MMEs with location information, cell IDs, TWAGs, etc.).

The network selection policy server 116 may be configured to use the information obtained from the core network components to dynamically create Wi-Fi network selection policies for the following types of scenarios: subscribers who use a lot of peer-to-peer traffic are offloaded more often; subscribers with expensive data plans who do not receive adequate service (e.g., dropped sessions), and in response the network selection policies are changed to improve the network experience; subscribers who reach a spending limit are given more aggressive offload policies; a subscriber who lives in an area in which data is offloaded too frequently causes a network selection policy change that results in him/her being kept on the cellular network (for quality of service or other reasons); and a frequently used application does not get the required network service from a specific network, and therefore its traffic is moved to an alternate network by updating the network selection policy.

The various embodiments may enable the network selection policy server to provide mobile network operator defined policies to control machine-to-machine (M2M) device side behaviors. For example, a user equipment identified as a machine-to-machine device may be given a different set of network selection policies (i.e., when a SIM card is allocated to the user equipment its end use may not be known, so the mobile network operator tracks its usage over time and changes its network selection policies if necessary). These network selection policies may enable the mobile network operator to manage which types of wireless networks the machine-to-machine devices can connect to, when the machine-to-machine devices can access the networks, where they can access the networks, and what data they can send and receive. In an embodiment, machine-to-machine type devices may access additional types of wireless networks that are more suited for their communication requirements, such as low power and low range personal area networks (e.g., Bluetooth, ZigBee).

As previously noted, the network selection policy server may use information obtained from policy management systems in order for it to dynamically create Wi-Fi network selection policies. The following are some examples of scenarios that may benefit from such network selection policies: enabling heavy usage and fair usage use cases to be extended to Wi-Fi offload policies (i.e., more aggressive Wi-Fi offloading rules incorporating offloading user equipments to a larger number of Wi-Fi access points, offloading user equipments with lower signal quality, and reducing the number of ISRP rules so that only very specific IP flows are kept on the cellular network when a Wi-Fi network is available); enabling subscribers with very low data usage to be kept on cellular networks unless cellular coverage is poor; enabling offload policies to be updated based upon a subscriber's historical data consumption; and enabling offload policies to be modified based on a subscriber's traffic usage characteristics obtained from a DPI.

As previously noted, the network selection policy server may use information obtained from charging systems in order for it to dynamically create Wi-Fi network selection policies. The following are some examples of scenarios that may benefit from such network selection policies: enabling the dynamic provisioning of Wi-Fi connectivity information for subscribers that have purchased Wi-Fi add-ons; enabling the dynamic provisioning of Wi-Fi connectivity information for subscribers that have purchased Wi-Fi roaming passes; and enabling the modification of offload behavior based upon subscribers' balances (e.g., a subscriber tops up by 20 dollars and gets access to domestic Wi-Fi networks for a month, a subscriber tops up by 50 dollars and additionally gets access to partner and roaming partner Wi-Fi networks for a month, a subscriber's balance drops below 1 dollar and his/her policies become more restrictive).

As previously noted, the network selection policy server may use information obtained from subscriber management systems in order to dynamically create Wi-Fi network selection policies. The following are some examples of scenarios that may benefit from such network selection policies: enabling specific business subscribers to receive offload policies for both domestic and international roaming partner Wi-Fi networks; enabling gold level subscribers to receive policies allowing access to all Wi-Fi networks, silver level subscribers to receive policies allowing access to only a subset of Wi-Fi networks, and bronze level subscribers to not receive access to any Wi-Fi networks; and enabling subscribers to set their own Wi-Fi network selection policies based upon their preferences and profiles (e.g., a student might select a "Cost Conscious" profile, and therefore may be offloaded more aggressively than a business person who selects a "Quality Focused" profile).

The user equipment may continually gather information and statistics about the Wi-Fi access points to which it has connected or can detect through scanning. This information is then periodically forwarded to the network selection policy server, where it is then analyzed in conjunction with information obtained from the subscriber management system, in order to give the mobile network operator insight into subscriber offload behavior and Wi-Fi network performance. The network selection policy server then creates appropriate Wi-Fi offload policies. For example, if the information reported from the user equipments shows that subscribers connected to a particular Wi-Fi access point consistently receive poor link speeds or poor radio link quality (or that the access point has consistently poor performance metrics at certain times of day, etc.), then the mobile network operator may update the Wi-Fi offload policies such that high value subscribers will not be offloaded to that particular access point. In this scenario, the network selection policy server instructs the user equipment not to connect to the access point. However, the network selection policy server could alternatively have instructed the user equipment to only connect to the access point when the signal strength is above a threshold.

Figure 11:
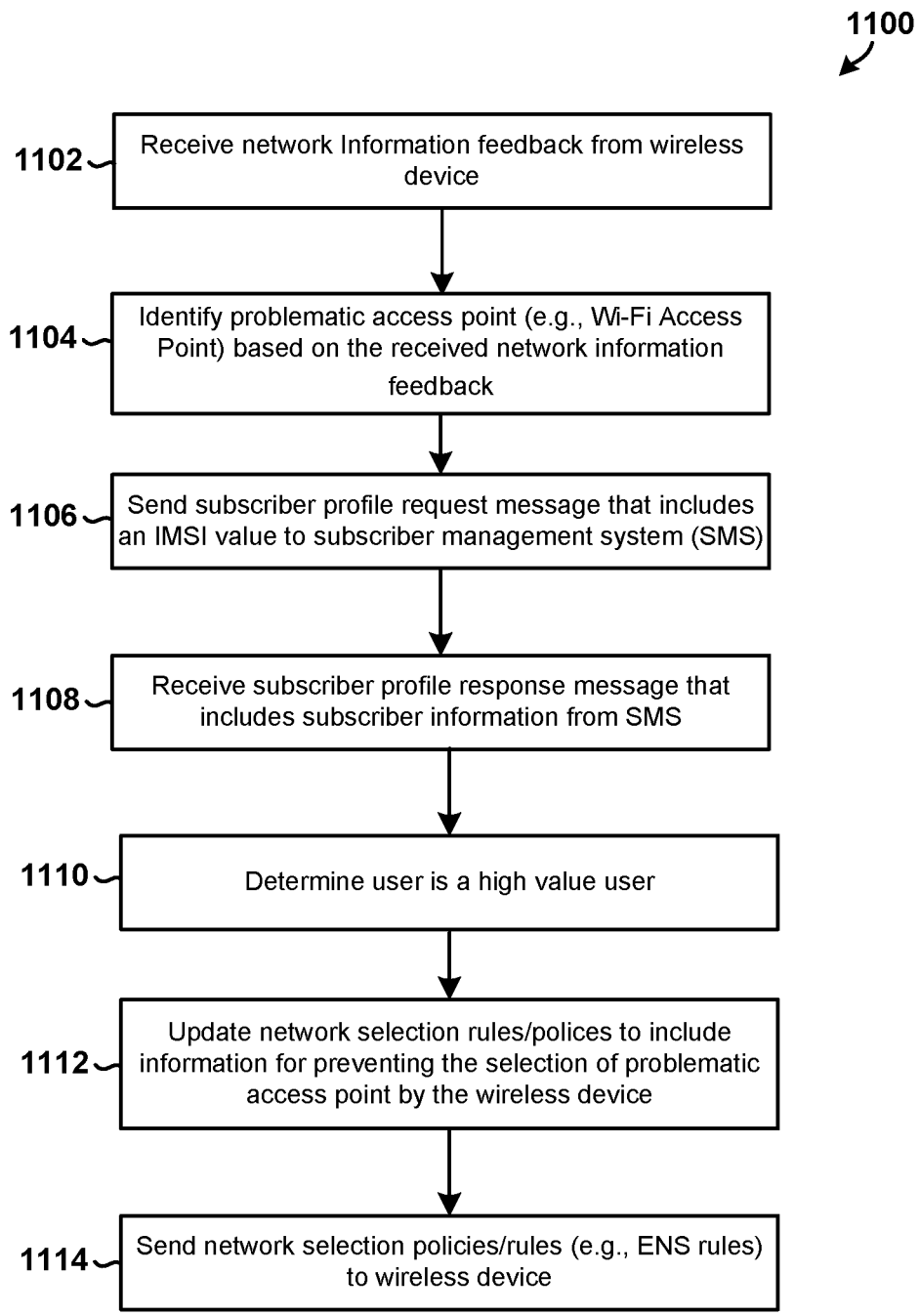
FIG. 11 is a process flow diagram illustrating an embodiment method of using information received from a subscriber management system to generate enhanced network selection rules suitable for causing a wireless device to intelligently transition between communication networks.

FIG. 11 illustrates an example method 1100 of using information obtained from a subscriber management system to generate or update network selection rules/policies. Method 1100 may be performed by a processor or processing core in a computing device that includes/implements all or portions of the network selection policy server. In block 1102, the processor may receive network information feedback (e.g., network measurements, statistics about a Wi-Fi access point, etc.) from a wireless device. In block 1104, the processor may use the received network information feedback to identify a problematic access point (e.g., Wi-Fi Access Point 1014, etc.)

In block 1106, the processor may send a subscriber profile request message that includes an IMSI value to the relevant subscriber management system (SMS). In block 1108, the processor may receive a subscriber profile response message that includes subscriber information from the SMS. In block 1110, the processor may determine user is a high value user (e.g., gold subscription level, etc.). In block 1112, the processor may update network selection rules/polices to include information for preventing the selection of the problematic access point by the wireless device. In block 1114, the processor may send the network selection policies/rules to the wireless device so as to prevent the device from selecting the problematic access point.

In an embodiment, the network selection policy server may be configured to use information obtained from a charging system to generate network selection rules or as part of a network selection decision. In this scenario, a user equipment has its network selection policies modified due to the subscriber's balance falling below a pre-defined threshold. The subscriber is subsequently only entitled to be offloaded to a much smaller set of Wi-Fi access points.

In an embodiment, the network selection policy server may be configured to use congestion information obtained from a cellular network to generate network selection rules or as part of a network selection decision. In this scenario, the network selection policy server receives feeds or triggers from network probes providing details of current network congestion levels. If a cell is congested, then the network selection policy server can request (e.g., from the user equipment mobility manager) information regarding which user equipments are currently connected to, or active on, the congested cell. The network selection policy server can use this information to force these user equipments to offload to a Wi-Fi network (assuming that some of the user equipments are within range of a Wi-Fi access point to which they can be offloaded, but have not yet been offloaded). This in turn may reduce network congestion. If ISRP is being used, then the network selection policy server could also adjust the ISRP rules to route more traffic via the Wi-Fi network. For example, if the ISRP rule for certain subscribers in the congested cell caused all web traffic to be routed over Wi-Fi and video calls to be routed over the cellular network, then this rule could be modified to cause all traffic to be routed over the Wi-Fi network.

In an embodiment, the network selection policy server may also receive network congestion information relating to the Wi-Fi network. By combining congestion information from both the cellular network and the Wi-Fi network the network selection policy server may dynamically update user equipment network selection policies to provide subscribers with an optimal experience by making sure that they are always connected to the fastest and least congested available network. In an enhanced embodiment, the network selection policy server may be able to use Hotspot 2.0 and ISRP to create enhanced network selection policies.

The various embodiments may enable the network selection policy server to create network selection policies based on the costs associated with accessing the network. There costs may need to be paid by the subscriber, or by the mobile network operator (e.g., when the mobile network operator has a roaming agreement with a Wi-Fi network operator). Thus, the various embodiments can ensure that subscribers only connect to networks that they can afford and/or to networks that minimize the mobile network operator's roaming costs.

In an embodiment, the network selection policy server may create network selection policies based exclusively on the subscriber's costs associated with accessing the network. In this scenario, cost information is sent to the user equipment as part of a managed object. The user equipment can then make a more informed network selection decision.

Figure 12:
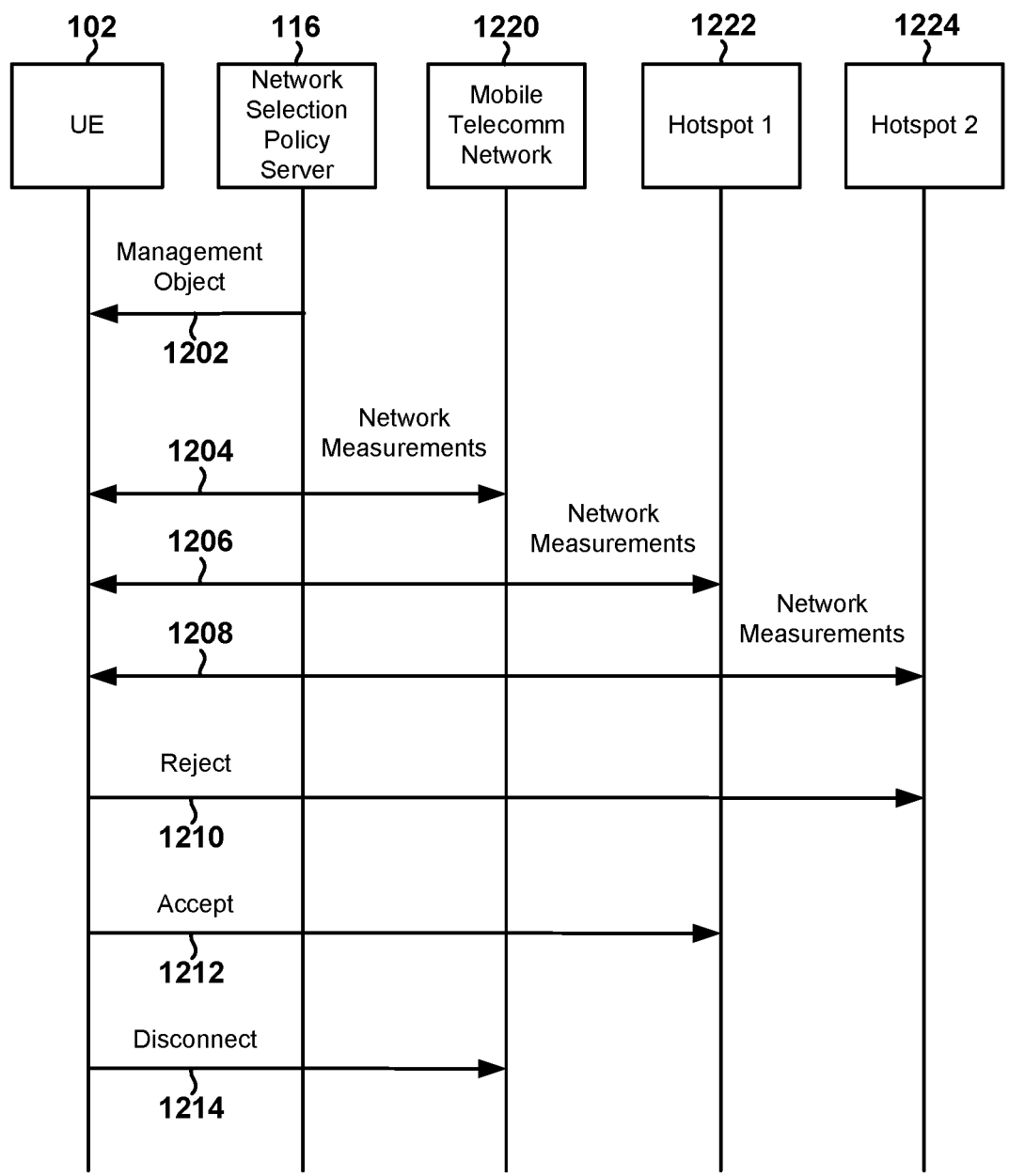
FIG. 12 is a message flow diagram illustrating an embodiment method of using costs associated with accessing the network as part of a network selection decision.

FIG. 12 is a message flow diagram illustrating that subscriber costs associated with accessing the network may be use as part of a network selection decision. In this example, there are three available networks (i.e., a cellular network and two Wi-Fi networks). In operation 1202, the network selection policy server 116 may send a management object that includes information suitable for identifying the costs associated with accessing the network to the UE 102. In an embodiment, the management object may be included in an ENS rule. In 1204, the UE 102 may obtain network measurements from the mobile telecommunication network 1220 (i.e., the mobile network to which it is currently attached). In operation 1206, the UE 102 may detect a first Wi-Fi network (i.e., Hotspot 1) 1222 and obtain network measurements from the associated access point. In operation 1208, the UE 102 may detect a second Wi-Fi network (i.e., Hotspot 2) 1224 and obtain network measurements from the associated access point. In operation 1210, the UE 102 may determine that the first Wi-Fi network 1222 is cheaper than the second Wi-Fi network 1224, and in response, send a connection rejection to the second Wi-Fi network. The user equipment may consider other factors such as the applications being used and the bandwidth being consumed, and such factors may be identified via an ENS rule. In operation 1212, the UE 102 may send a connection acceptance to the first Wi-Fi network 1222. In operation 1214, the UE 102 may optionally send a disconnect message to the mobile telecommunication network 1220.

Both subscriber costs associated with accessing the network and mobile network operator costs associated with accessing the network may be used as part of a network selection decision. For example, the network selection policy server may communicate with other network components in order to determine the networks the user equipment can access. In this example, the first Wi-Fi network may be deemed too expensive, and as a result, not included as a candidate network in the network selection policy. The network selection rule/policy may then be sent to the user equipment. The user equipment may implement and use network selection rule/policy, the result of which may be that the user equipment ignores the first Wi-Fi network and connects to the second Wi-Fi network.

An updated wireless technology, known as Hotspot 2.0 Release 2, is becoming more prevalent in Wi-Fi networks. This updated technology extends functionality beyond network selection to incorporate a common cross vendor provisioning methodology. This will allow a mobile network operator to provision security credentials and network selection rules automatically on a device with no SIM. Thus, this functionality is very similar to ANDSF, and indeed the developers of both technologies are coordinating with each other to ensure that both technologies are compatible. For example, both Hotspot 2.0 Release 2 and ANDSF use the same management objects. It is likely that there will be two approaches to device provisioning for Hotspot 2.0 networks—ANDSF will be used by mobile network operators to provision 3GPP compliant devices, and the Hotspot 2.0 provisioning approach will be used for devices without SIMs and by Wi-Fi only network operators. It is essential that both of these approaches are compatible with each other and that they do not conflict. This is particularly important in the context of a 3GPP device because it may receive network selection policies based on both approaches.

In the various embodiments, the network selection policy server may provide device provisioning capabilities for both devices using ANDSF and devices using Hotspot 2.0. Thus, it may provide network selection policies to both 3GPP devices and Hotspot 2.0 only capable devices. This would enable a mobile network operator to provide a subscriber with coordinated Wi-Fi network selection policies for both their SIM and non-SIM devices from a single centralized server. Said another way, the network selection policy server may send a first policy (e.g., via a first enhanced network selection rule) to a first type of device (e.g., SIM devices) and a second policy to a second type of device (e.g., non-SIM devices). The second policy may include the same or different rules than the first policy. For example, if every rule in the first policy includes/evaluates a condition relating to the cellular network, then the every rule in the second policy will be modified or different than the rules in the first policy. The second policy may also include a subset of the rules included in the first policy. For example, the cellular network rules may be removed from the second policy, but the non-cellular rules remain unchanged (e.g., are same in the first and second policies). In some embodiments, the second policy may be in a different format and/or use a different protocol than the first policy.

For example, a subscriber may receive cellular and Wi-Fi service for his/her primary device from a mobile network operator that provides network selection policies using a network selection policy server. The mobile network operator may then provide an optional service in which the subscriber can add non-SIM devices to his/her account. These devices may then also receive network selection policies from the network selection policy server (e.g., via ENS rules, etc.). The non-SIM device may require the use of Hotspot 2.0 Release 2 provisioning in order to receive the network selection policies. Therefore, the network selection policy server is capable of delivering the network selection policies using both ANDSF and Hotspot 2.0 Release 2 interfaces.

S2a Mobility over GTP (SaMOG) is an emerging standard for integrating trusted Wi-Fi networks into the EPC architecture of cellular networks defined by the 3GPP. These trusted Wi-Fi networks are typically owned by either the mobile network operator, or a roaming partner network with which the mobile network operator has both commercial and technical relationships. In order to verify the trustworthiness of the Wi-Fi network, and to allow the user equipment to seamlessly authenticate to the Wi-Fi access points, the 802.1x standard is used in conjunction with the EAP-SIM standard. These standards are widely supported by both user equipments and Wi-Fi access points. Another advantage of these standards is that a mobile network operator can use its existing authentication, authorization and accounting (AAA) infrastructure and components to authenticate the user equipments on the Wi-Fi network. This authentication information is transported between the Wi-Fi network and the EPC AAA infrastructure via the STa reference point.

Since SaMOG enables trusted Wi-Fi networks to become extensions of EPC based cellular networks, all of the data traversing the Wi-Fi networks will also traverse the core network. Therefore, the mobile network operator can treat it as any other traffic traversing the core. For example, it can: apply policies to the traffic to ensure quality of service or quality of experience; inspect it using DPI components; perform analytics on it; charge for transporting it; lawfully intercept it; and integrate it with cellular services such as IMS.

SaMOG also introduces the concept of a Trusted Wireless Access Gateway (TWAG). This highly scalable gateway is deployed as part of the Wi-Fi network, and it terminates GRE tunnels from the Wi-Fi access points. It then connects to the EPC via the S2a interface, which uses either GTPv2 or PMIP to connect directly to the PGW. In roaming scenarios (i.e., scenarios in which the Wi-Fi network is not operated by the mobile network operator) the TWAG is responsible for forwarding authentication requests to the authentication, authorization and accounting (AAA) infrastructure in the appropriate mobile network operator. In these scenarios all data from the user equipments is forwarded to their home EPCs.

The SaMOG architecture supports session mobility as the user equipment moves between access networks. However, as there is no user equipment side support this mobility is not seamless, and the user may notice short interruptions in connectivity which may also impact the connectivity state of applications.

The various embodiments may enable the coordination of policy controls between the core network and the Wi-Fi network. As previously noted, SaMOG causes all traffic to be routed through the core network. However, this may not be desirable in some scenarios. For example, mobile network operators may want to enable local breakout and LIPA/SIPTO behavior in the TWAG so that only specific traffic is routed via the core network, while other traffic may be offloaded at the TWAG or at the access point (if supported). Furthermore, it may also be desirable to apply local policy control at the TWAG so that traffic modification (e.g., shaping, restricting, blocking) can occur at the TWAG rather than in the BBERF or PGW (i.e., in the PCEF) as currently defined.

This coordination of policy controls may be achieved using a new interface between the network selection policy server, or the policy management system, and the TWAG. This interface would also allow the policy management system to control the MAC layer traffic priorities for each subscriber connected to every access point (assuming that the access point is Hotspot 2.0 compliant and that the TWAG supports the pushing of QoSMaps to the access points). This interface and the associated functionality would enable core offload and LIPA/SIPTO over SaMOG capable Wi-Fi networks.

Figure 13:
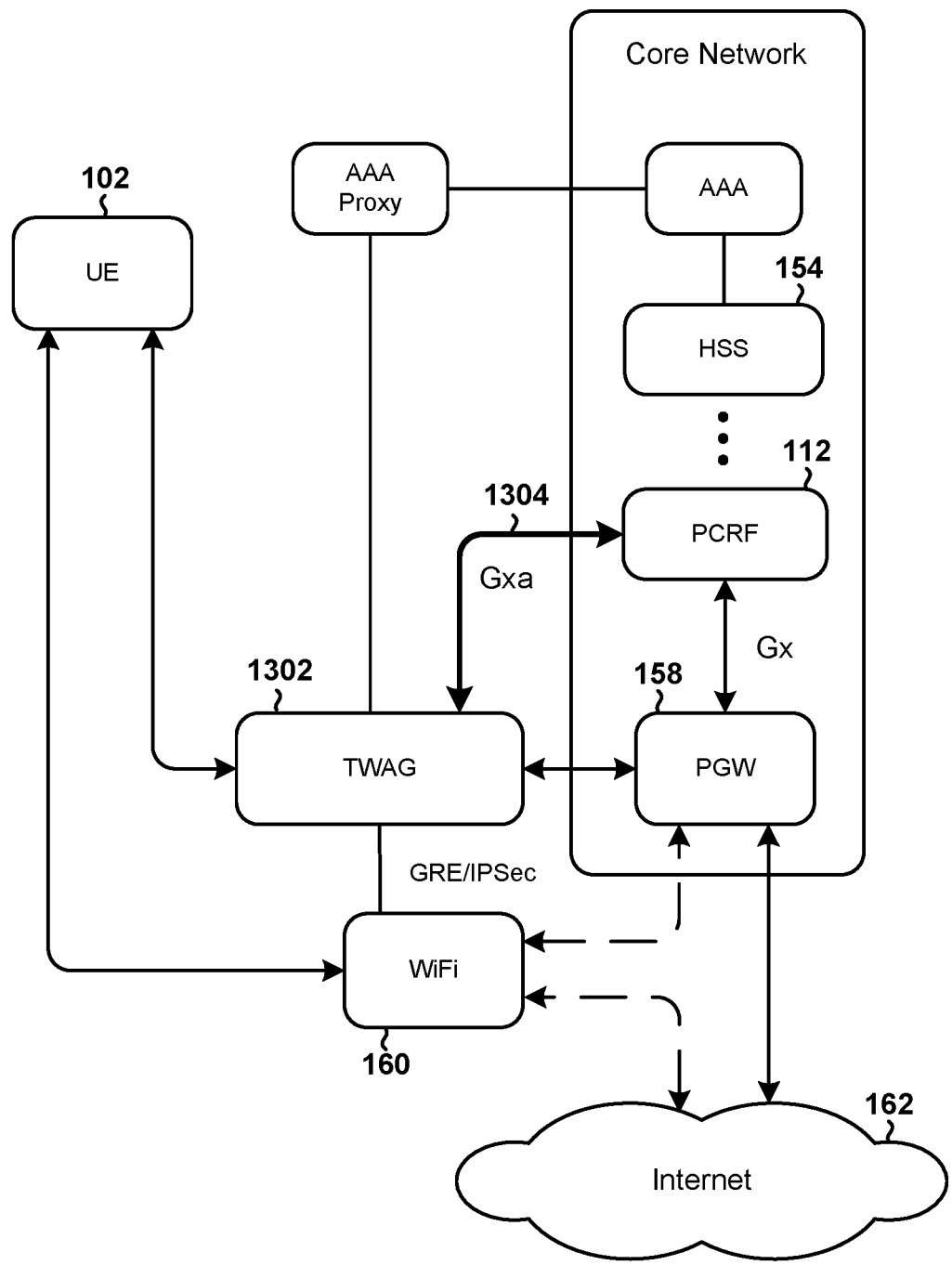
FIG. 13 is an architectural drawing showing an example architecture containing the new interface between a policy management system and a Trusted Wireless Access Gateway (TWAG).

FIG. 13 illustrates that a new interface 1304 may be generated/created between the policy management system (i.e., the PCRF 112) and a TWAG 1302. The PCRF 112 may provide coordination between the TWAG 1302 and PCEF 110 in the PGW 158. All traffic traverses the PGW 158, and therefore the Gx interface between the PCRF 112 and the PGW 158 may be used to provide policies for traffic originating from SaMOG Wi-Fi networks. Similarly, the PCRF 112 can use the Gxa (or an equivalent) interface with the TWAG 1302. The PCRF 112 may then provide service data flow (SDF) rules (which may optionally be enhanced with application detection and control (ADC)) to the TWAG 1302 indicating which traffic flows may be broken out locally and which require routing to the PCEF 110. The PCRF 112 may be Wi-Fi network aware so that separate policies can be applied to traffic from Wi-Fi networks and traffic from cellular networks. Thus, all user plane traffic may traverse the core network so that policies may be applied. Since it may be desirable for a mobile network operator to reduce core network load by selectively breaking some traffic out locally at the TWAG 1302, this gives the mobile network operator fine grained control over which traffic will traverse the core network and which will have local breakout applied.

There are many examples of scenarios that may benefit from the coordination of policy controls between the core network and the Wi-Fi network. For example, in SIPTO scenarios the PCRF 112 may define which IP flows are broken out locally at the TWAG 1302 or access point. This would allow the mobile network operator to have only the traffic requiring mobility and/or being sent to a specific access point to be routed via the core network. All other traffic could be broken out locally, thereby reducing backhaul utilization and core network resources. In policy control scenarios, the PCRF 112 could inform the TWAG 1302 of the quality of service requirements of a subscriber's flow or session. The TWAG 1302 could enforce this policy through traffic modification and access point quality of service parameter setting (e.g., using QoSMaps) thereby alleviating load on the network. In charging scenarios, the PCRF 112 could push data limit information to the TWAG 1302. For example, the PCRF 112 could inform the TWAG 1302 of a subscriber's consumption threshold, and only when this threshold is reached does the TWAG 1302 inform the PCRF 112 or block the subscriber's traffic. For more complex charging scenarios the TWAG 1302 may contain a Gy interface to an OCS or a Gz interface to an OFCS for the charging of local breakout traffic. In roaming scenarios in which the Wi-Fi network and TWAG are not on the user equipment's home network, then additional interfaces may be required. In the scenario were traffic is broken out locally at the TWAG 1302 in the VPLMN, an S9 interface between the H-PCRF and the V-PCRF may be required for exchanging metering and policy information between the networks. In event reporting scenarios, the Gxa interface can be enhanced with additional parameters (i.e., Diameter AVPs) so that the TWAG 1302 can provide Wi-Fi specific information. This can be used to exchange link rate and link rate change information. As a user equipment moves away from a Wi-Fi access point, the physical layer data rate decreases in defined steps. This process is known as link rate adaptation, and it may impact the quality of service and bandwidth requirements in the PGW 158 and TWAG 1302. By making the PCRF 112 and PGW 158 aware of these changes, the network selection policy server may modify the subscriber policies to minimize over provisioning in the PGW 158 or TWAG 1302. Additionally, the Gxa interface can be enhanced with additional parameters to support congestion notification. A Wi-Fi access point may become congested due to increased contention, resulting in reduced quality of service and throughput. These changes could also be reflected in the PGW 158 or TWAG 1302.

ANDSF as currently defined by the 3GPP is relatively static, and it is not designed for frequent network selection policy updates between the client and server. Therefore, it is limited in its ability to be used in reaction to real-time network changes (e.g., during periods of increased cellular network congestion). The signaling required between the ANDSF server and the user equipment to perform network selection policy updates is relatively high, because it requires the initiation of a data connection and a number of message exchanges. This may involve the server sending a message to the user equipment (e.g., using a text message, short message service, etc.) instructing it to establish a data connection with the ANDSF server (e.g., using the S14 interface) to retrieve the updated network selection policy. Thus, ANDSF may not be suitable for use during periods of high network congestion, and when very dynamic network selection policy changes are required.

Therefore, the various embodiments may enable a network selection policy server to send network selection policies, containing rules that are marked as inactive, to the user equipment as part of a regular policy update. The user equipment stores these network selection rules, but it does not evaluate them when making network selection decisions because they are dormant. The network selection policy server may subsequently activate these inactive rules on the user equipment, without requiring the user equipment to have an active connection with the network selection policy server, by sending an out-of-band rule activation message using a signaling method with low overhead. Similarly, these rules may be deactivated without requiring the user equipment to have an active connection with the network selection policy server, by sending an out-of-band rule de-activation message. The user equipment can then use these network selection rules when making network selection decisions. These embodiments may be particularly advantageous in scenarios in which there are commonly used rules that need to be activated and deactivated on a frequent basis.

In an embodiment in which the network selection policy server is realized as an ANDSF server, the management object can be extended so that each rule has a new node (e.g., RuleActive) that is a flag indicating if the rule is to be included in the set of rules that can be evaluated when making network selection decision.

There are several signaling methods with low overheads suitable for use with the various embodiments. In one embodiment, the network selection policy server may send a type 0 short message service message to the user equipment. This message could contain a reference to the rule to be marked as active or inactive, rather than instructing the user equipment to establish a connection with the network selection policy server. The message could simply refer to a specific rule identifier (e.g., "ActivateRule(RuleID)"), or it may reference the URI of the leaf being modified (e.g., Replace(Policy/X/RuleActive)). These messages may also be sent using a notification system such as Google Cloud Messaging or iOS notifications. Alternatively, the Non-access stratum (NAS) between the wireless device mobility manager and user equipment may be used by including the activation or deactivation message within a generic container message (i.e., the downlink generic NAS transport message). This would require an interface between the network selection policy server and the wireless device mobility manager. A network selection policy server may use this interface to send an activation or deactivation message to a device mobility manager (e.g., an MME), which subsequently sends the message to the user equipment device.

The various embodiments may enable dynamic service provisioning whereby subscribers purchase Wi-Fi network access (e.g., domestic, partner, or roaming Wi-Fi network access), and subsequently have their devices automatically provisioned with network selection policies that enable discovery and selection of these networks. For example, a subscriber may purchase roaming Wi-Fi network access that gives him/her access to a large number of Wi-Fi access points. Instead of the subscriber having to know where these access points are located, then manually selecting them, and finally going through a cumbersome login process, the network selection policy server may provision the wireless device automatically in response to the subscriber purchasing the roaming pass.

In an embodiment, the network selection policy server may communicate with a mobile application server in order to provide subscribers with the ability to purchase Wi-Fi network access. Details of the mobile application server are disclosed in U.S. Pat. No. 8,929,859 titled "Systems For Enabling Subscriber Monitoring Of Telecommunications Network Usages And Servers Plans" issued Jan. 6, 2015, the entire contents of which is hereby incorporated by reference for all purposes. A subscriber may use his/her device to purchase Wi-Fi network access by invoking a dynamic services interface on the mobile application server. The mobile application server may query a charging system to ensure that the subscriber has sufficient funds for the purchase. If there are insufficient funds then the process terminates with the mobile application server providing feedback to the user equipment (wireless device). The mobile application server may also inform an access control manager of the purchase so that the subscriber will be correctly authorized when accessing the Wi-Fi network. In addition, the mobile application server may inform a network selection policy server of the subscriber's purchase. This may cause the network selection policy server to update the subscriber's network selection policies to enable him/her to access to the appropriate Wi-Fi networks. The network selection policy server then sends updated network selection policies to the user equipment (e.g., using the S14 reference point interface). If the network selection policy server cannot send the updated network selection policies to the user equipment (i.e., pushing messages is not support), then the network selection policies will be updated the next time that the user equipment requests updated network selection policies. Finally, the user equipment may automatically connect to the newly provisioned Wi-Fi access points. When access to these Wi-Fi networks is no longer allowed (e.g., when the access has expired), then the network selection policies may be removed from the user equipment and the subscriber's authorization rights may be revoked.

Technologies such as network selection policy servers, and Wi-Fi integration with cellular networks (e.g., SaMOG), are changing Wi-Fi networks from the traditional ad-hoc, best effort, non-managed networks into a key part of mobile network operators' networks. There are significant differences between traditional Wi-Fi networks and emerging mobile network operator controlled Wi-Fi networks. However, user equipments do not currently indicate the type of Wi-Fi networks that they are connected to, or if the Wi-Fi network provides cellular network integration. Furthermore, there is a general perception amongst subscribers that Wi-Fi networks are a free, or cheap, way of gaining Internet access. Subscribers do not expect cellular network integration, do not expect to be charged for Wi-Fi network access, and do not expect their Wi-Fi network access to impact their cellular data allowances.

The various embodiments may enable the user equipments to display different icons representing the different types of Wi-Fi network connectivity in order to differentiate to the subscribers between traditional Wi-Fi networks and mobile network operator controlled Wi-Fi networks. These icons may differ by color or styling, and they can be displayed within an application, as part of a widget, as part of a connectivity manager, or as part of the existing user equipment connectivity icons (e.g., on the system bar, on the title bar).

A user equipment device may display an icon representing traditional Wi-Fi network connectivity as a series of concentric arcs. When the user equipment connects to a mobile network operator controlled Wi-Fi network the icon may change colors, be combined with another icon (e.g., the network operator's logo, etc.), etc.

In an embodiment, the user equipment device may be configured to use several icons representing different types of network connectivity, including a mobile network operator controlled Wi-Fi network connectivity icon containing the letter "w". In an alternative embodiment, the Wi-Fi network connectivity icon could be displayed alongside other network connectivity icons.

In an enhanced embodiment, the network connectivity icon is not limited to just two network connectivity types (i.e., traditional Wi-Fi networks and mobile network operator controlled Wi-Fi networks), and it may include a wide variety of network connectivity types (e.g., core integrated Wi-Fi network access, premium carrier grade Wi-Fi network access, non-carrier grade operator Wi-Fi network access, paid Wi-Fi network access, free Wi-Fi network access, and private Wi-Fi network access).

In another embodiment, the network selection policy server can place additional information in the network selection policies that either represents a network connectivity icon or identifies a network connectivity icon that is already present on the user equipment. In an embodiment in which the network selection policy server is realized as an ANDSF server, the network connectivity icon information would be embedded in the management object. Another example in which network connectivity icons can be used occurs with Hotspot 2.0. In this scenario the access point is capable of advertising which mobile network operators have roaming agreements with the Wi-Fi network provider. The user equipment can use this information to display a specific network connectivity icon (e.g., incorporating mobile network operator logos), which informs the subscriber which mobile network operators the access point is advertising. This enables the subscriber to see at a glance if his/her mobile network operator is one of the roaming consortiums being advertised by the access point.

In certain circumstances (i.e., in Wi-Fi networks not using SaMOG and IFOM), when a user equipment detects either a Wi-Fi access point to which it has previously been connected, or a Wi-Fi access point for which its connection manager is provisioned, it will automatically attempt to connect to the access point. Once the user equipment has Internet connectivity via the Wi-Fi access point, then it no longer requires data connectivity via the cellular network. Therefore, the cellular network data connections are torn down. The mobile network operator detects that the user equipment has disconnected from the cellular network, but it has no visibility or reasoning into why this disconnection occurred.

Similarly, for ISRP capable user equipments (i.e., user equipments with multi-radio data connectivity capabilities) that have been provisioned by a network selection policy server, the user equipment can optionally maintain connectivity via multiple networks (e.g., a Wi-Fi network and a cellular network). However, if the user equipment decides to route all of its traffic flows via the Wi-Fi network, then the mobile network operator has no visibility or reasoning into why the cellular network connection is not being used.

The various embodiments may introduce additional cause codes for use when cellular network data connections are torn down and/or inverse cause codes for use when cellular network data connections are established. This means that the mobile network operators would be able to distinguish between a user equipment ceasing data connectivity and a user equipment transferring data connectivity to a Wi-Fi network. Hence, mobile network operators could collect statistical and analytical information regarding how frequently Wi-Fi offloading/onloading is occurring.

The cause codes and/or inverse cause codes may be included in the network selection rules. For example, an operator may create a first rule for offloading in a first hotspot, a second rule for offloading in a second hotspot, add a first cause code (e.g., "WiFiOfloadhotspot1") to the first rule, and add a second cause code (e.g., "WiFiOfloadhotspot2") to the second rule. As a result, if the user disconnects from the cellular network, the operator will be able to determine that the disconnection was due to offloading, whether the first or second rule caused the offload, and the hotspot to which the device was offloaded. For the same or similar reasons, the operations could include cause codes and/or inverse cause codes for onloading (e.g., for transitions from a WiFi network to the cellular network).

In a non-EUTRAN cellular network, an additional cause code would be added to the PDP context deactivation message (e.g., a "Deactivate PDP Context Request" message) from the mobile network radio station to the gateway to indicate that the cellular disconnection was due to a Wi-Fi connection being available. For example, the wireless device may generate the Deactivate PDP Context Request message to include a cause code set to "WIFI." This would indicate the relevant network components (e.g., SGSN, GGSN, etc.) that disconnection was due to a Wi-Fi connection being available.

In a EUTRAN cellular network, an additional cause code could be added to the PDN disconnection message (e.g., a "PDN Disconnection Request" message) from the user equipment to the gateway to indicate that the cellular disconnection was due to a Wi-Fi connection being available. For example, the wireless device may generate the PDN Disconnection Request message to include a cause code set to "WIFI." This would indicate the relevant network components (e.g., SGW, PGW, PCRF, etc.) that disconnection was due to a Wi-Fi connection being available.

The various embodiments may enable a core network node (e.g., a network selection policy server, a wireless device mobility manager such as an MME in a 3GPP LTE/EPC network, a location server, a network probe, a Wireless LAN Controller (WLC), Wireless Access Gateway (WAG)) to understand device mobility in the radio access network (RAN). An example of an application in which such an understanding may be beneficial is in congestion management. When a radio access network, or specifically the cells in a radio access network, report congestion information to another network node, only certain information is useful. Information relating to devices that are only temporarily located in a particular cell is of limited value when trying to alleviate cell congestion. Indeed, reporting information about these transient devices may make the situation worse, as it will reflect a temporary and inaccurate view of the cell. For example, if a car is driving through a cell, and a device in the car is consuming a lot of radio access network resources, then this may contribute to the cell being congested. However, the congestion in the cell will immediately decrease when the car leaves the cell. If a congestion measurement or calculation is made while the car is in the cell, this may result in a corrective action (e.g., a policy management system may lower the radio access network resources available to other devices in the cell). This corrective action is of minimal or no value, because the congestion is only temporary, and the corrective action will have to be reversed shortly. This may lead to unnecessary signaling. Similar situations may arise in cells where a large number of devices temporarily enter and exit within short time periods (e.g., a passenger train traversing a cell, a public demonstration through a city centre).

In order to address this problem, the network node determining the radio access network cell congestion may not include all device mobility information in its calculations. In particular, the network node may not include mobility information relating to devices that are very mobile, and thus likely to leave the cell within a short time period. The exclusion of this information may be due to either the cells filtering and discarding certain device mobility information from the wireless device mobility information that they send to the network node, or the network node may filter and discard this information before determining the radio access network cell congestion.

The various embodiments may be suitable for use with any form of radio access technology where devices enter and leave cells (e.g., 2G, 3G, 4G, WiMax, Wi-Fi), and the cells can be of any type and size (e.g., macrocells, microcells, femtocells, picocells).

In an embodiment, the rate of movement of the wireless devices can be calculated based upon the frequency of location change notifications. These location change notifications can include tracking area updates, location area updates, and (e)NodeB changes in 3GPP networks. Similarly, they can include the number of connections/disconnections to Wi-Fi access points in Wi-Fi networks. The location change notifications may be directly accessible from the cells, or through some network node that obtains information from multiple cells (e.g., an MME, S-GW, or location server in a 3GPP network). The use of location change notifications provides a relatively granular method of determining the rate of movement of the wireless devices. Thus, the rate of movement of each device can be calculated as:

$$\text{Rate of Device Movement} = \frac{\text{Number of location change notifications}}{\text{Time}}$$

"Time" may be a configurable variable that may be based upon the network topology (e.g., the average size of the cells, the amount of time it typically takes to move between cells), and it may be dynamically updated as the wireless device changes location (e.g., when the wireless device moves between regions of varying cell densities).

In an embodiment, the rate of movement of the wireless devices may be calculated based upon their locations (e.g., latitude and longitude) over time. These locations may be calculated within the wireless device (e.g., using motion and position sensors such as accelerometers and GPS receivers) or by the network. This method may be very accurate, but it may be difficult to obtain, computationally complex, and cause subscriber privacy concerns. In an alternative embodiment, the rate of movement of the wireless devices may be calculated based upon the amount of time that they spend in a cell (i.e., a device that has just entered a cell is more likely to leave it than a device that has been in the cell for a longer period of time). Thus, the lag time described previously may be used. In yet another embodiment, the rate of movement of the wireless devices can be calculated based upon changing signal level measurements (e.g., link rate adaptation changes, SINR changes, RSSI changes).

Thus, devices with a high rate of movement may not be included, or have a low weighting factor applied, when determining the radio access network cell congestion. Conversely, devices with a low rate of movement may be weighted heavier when determining the radio access network cell congestion.

In an enhanced embodiment, the rate of movement of the wireless devices can be used for other purposes, such as targeting advertisements to customers who enter a shop in a shopping centre, or tracking the customers as they move around the shop. In this embodiment, targeted adverts will not be sent to a subscriber who is merely passing briskly through the shopping centre, because such subscribers will have a very high rate of device movement.

The various embodiments may enable the network selection policy server to create policies for managing a device's ability to connect to other devices using a wireless peer-to-peer networking technology (e.g., Wi-Fi Direct, LTE Direct, Bluetooth®). These policies may include rules that specify which wireless peer-to-peer networking technologies are enabled on the wireless device, and the conditions under which the wireless device may connect to other peer devices. The other peer devices may belong to a single subscriber (e.g., a smart phone connecting to a smart television), or they may belong to other subscribers (e.g., family members, corporate groups, unknown subscribers). The other peer devices may include printers and desktop computing peripheral devices, advertising billboards (e.g., to distribute coupons, offers, vouchers), health and exercise devices (e.g., blood pressure monitors, treadmills, stair climbers), smart cars, house alarms, and gaming devices. The policies may specify different rules depending on the owners, and the wireless device types, of the other peer devices.

In an embodiment, the network selection policies relating to wireless peer-to-peer networking technology may be set by the mobile network operator. For example, the mobile network operator may not allow subscribers with subsidized devices to block connections to proximity based advertising and offers (e.g., billboards), or to subsets of advertising and offers belonging to commercial partners of the mobile network operator. In this scenario, the mobile network operator may share in any revenues resulting from a fulfillment of an offer (e.g., if the subscriber buys an item using a coupon that was delivered from a commercial partner's advertising). Furthermore, the mobile network operator may use the connection information for analytics purposes (e.g., targeting subscribers with relevant offers and coupons, tracking subscribers, determine fulfillment rates for offers and coupons). The mobile network operator may define limits on the number of concurrent wireless peer-to-peer connections, or on the maximum number of wireless peer-to-peer connections in a defined time period (e.g., per day). The mobile network operator may not permit devices to tether using a wireless peer-to-peer networking technology if the subscriber's plan does not permit tethering. In such cases the mobile network operator may enable the subscriber to temporarily or permanently upgrade his/her account to allow tethering. The mobile network operator may block wireless peer-to-peer connections on a per application basis.

Such policies may include rules to always allow connections from applications associated with emergencies, but to block other applications depending on contextual information (e.g., location, time of day, subscriber information, application type). The mobile network operator may only allow wireless peer-to-peer connections for multi-person gaming purposes if the game is provided on a pay-as-you-play basis by the mobile network operator or a commercial partner. Such policies may include rules to always allow connections from an application. The mobile network operator may dynamically change the restrictiveness of policies based upon additional information obtained from other components or systems (e.g., a device's ability to make wireless peer-to-peer connections may decrease as the subscriber's credit balance decreases).

In an embodiment, the network selection policies relating to wireless peer-to-peer networking technology may be set by the subscriber (e.g., using a mobile application server). For example, the subscriber may block general advertising related connections to or from his/her device, but allow specific advertising related connections relating to specific categories of advertising (e.g., advertising relating to a sport that interests the subscriber) or advertisers (e.g., an advertiser with whom the subscriber has a loyalty plan). The subscriber may define his/her polices on a per application basis (e.g., allow enterprise applications and classroom apps, allow printing from applications, disallow games, disallow image/picture sharing applications); based upon date and time information; based upon the wireless device's location (e.g., only when at home); in terms of whitelists (e.g., only allow connection to family owned devices); and based on any mix of these criteria (e.g., games are allowed only when also connected to the home network, and not during homework hours on school nights). In an enhanced embodiment, a subscriber may set the network selection policies relating to wireless peer-to-peer networking technology on behalf of another dependent subscriber (e.g., a parent may set the policies for a child or an employer may set the policies for an employee). In this scenario, the policies would be enforced on all devices that the dependent subscriber uses.

A Wi-Fi community may include public hotspots (in squares, malls, etc.) plus home Wi-Fi modems of subscribers. A public access point may be made available to the public, and the owner of a Wi-Fi modem may have different access points for his private usage in the same modem. If all the hotspots used by the subscriber were in the Wi-Fi community, it would be easy for the network operator to control the network selection priorities, either in the network (e.g., in an AAA server) or in the wireless device. For example, the operator may provide a smart client to manage the connectivity within the Wi-Fi community. However, the subscribers usually use their device to connect to hotspots outside the Wi-Fi community, which makes intelligently determining the network selection priorities more challenging.

For example, when a subscriber is at home and has a Wi-Fi community hotspot nearby, the device may "see" two accessible hotspots and choose the one with a better signal. This may become a problematic because the device can remain connected to a neighbor's hotspot instead of the subscriber's own, or if the subscriber uses the device to connect to the office Wi-Fi, the device could connect to another hotspot unintentionally and create potential security problems. This scenario may also provide the user with a slower connection because the traffic is being routed over a third party network rather than over the corporate network. It may also prevent the user from being able to access corporate resources due to being connected via an "external" network.

The manual prioritization of networks/hotspots in the subscriber's device could help to mitigate some of these issues. However, manual prioritization doesn't solve the problems, and is susceptible to both intentional and unintentional misuse. For example, the subscriber may be an average user with poor skills in device management. The subscriber may also choose to intentionally connect to the neighbor hotspot in order to reserve bandwidth in his own hotspot/network for other purposes (e.g., massive video streaming). The various embodiments overcome these limitations of conventional solutions by automating the prioritization of networks/hotspots in the device and allowing the network operator to control this prioritization.

The network selection policy server may be configured to determine the hotspots that are to be prioritized, determine the priorities for the hotspots, and send the hotspot priorities to the wireless device to cause the device to apply the priorities. This may be transparent to the user, and the operations may be performed so that the user does not need to perform any actions/operations for the device to select the most appropriate network.

The network selection policy server may be configured to use machine learning techniques and/or a learning algorithm to learn the relative importance of private hotspots over time (e.g., based on the device's network usage patterns, the user's preferences, etc.) and prioritize the hotspots based on their relative importance. Generally, such techniques/algorithms include a learning phase in which a data/behaviour model is generated, and a prediction phase in which the generated data/behaviour model is executed, used, or applied to behaviour information to generate predictive analysis results. For example, the network selection policy server may collect network usage information from the user equipment device, generate an information structure (e.g., a feature vector, etc.) that characterizes the collected network usage information, apply a data/behavior model to the generated structure to test/evaluate various conditions (e.g., amount of data consumed via the hotspot, frequency in which the hotspot is used, etc.). Applying the data/behavior model to the generated structure may generate predictive analysis results that may be used to determine the relative importance of the private hotspots over time and/or to otherwise determine priorities for the hotspots.

The network selection policy server may be configured to differentiate hotspots and/or assign priorities to the hotspots based on the method used to configure the hotspot in the wireless device. For example, if the user configured a hotspot manually, then that hotspot may be given priority ahead of hotspots in the Wi-Fi community.

The network selection policy server may be configured to implement different types of prioritization routines/procedures, such as prioritization based on authentication patterns and prioritization based on usage patterns. In addition, a user/device may mark manually configured hotspots as favorites (e.g., by adding it to a favorites list, etc.). In this scenario, favorite hotspots may be given priority ahead of hotspots in the Wi-Fi community, and hotspots in the Wi-Fi community may be given priority ahead of manually configured hotspots that are not favorite hotspots.

In the case of prioritization based on authentication patterns, the network selection policy server may be configured to determine the priorities based on the subscriber's network authentication. In the case of prioritization based on usage patterns, the network selection policy server may determine priorities based on collected usage information. In an embodiment, the network selection policy server may include a database that stores a list of hotspots for each subscriber and their relative priorities. Each prioritization routine/procedure may be implemented or performed independently or in combination with other prioritization routines/procedures.

The network selection policy server may be configured to determine network selection priorities based on authentication patterns. The principle of this mechanism is that the subscriber usually enters manually the credentials for hotspots that are considered very important (e.g., home hotspots, office hotspots, etc.) or not part of the Wi-Fi community (i.e., the wireless device/client cannot connect to them on behalf of the user). The wireless device will send statistics about the hotspots (SSIDS, authentication methods, amount of time connection was used, number of bytes consumed, etc.) to the network selection policy server. This allows the network selection policy server to have more complete information about usage of hotspots in the Wi-Fi community, and the relative importance of each hotspot. Since the Wi-Fi community of the operator may be built with a AAA server where the subscribers authenticate when they connect to a hotspot, in an embodiment, the network selection policy server could check against this AAA server in order to find out if the subscriber has authenticated in that hotspot. If not, the subscriber was authenticated directly against the Wi-Fi modem or to another AAA server (from another Wi-Fi provider), and that hotspot takes a different priority than the Wi-Fi community hotspots. This could be extended to third party Wi-Fi communities, in which the network selection policy server communicates with the third party AAA server and applies different priorities to the third party hotspots. This becomes especially interesting in high-density hotspot zones like shopping malls.

Thus, the network selection policy server may determine the hotspots that are used by the subscriber and not part of the Wi-Fi community, and apply a different priority to those hotspots than the ones that belong to a Wi-Fi community. In addition, the network selection policy server may determine the hotspot priorities based on the nature and purpose of the hotspots or their usage. For example, the network selection policy server could assign the highest priorities to private hotspots (e.g., in the subscriber's home, work, etc.), the next highest priorities to hotspots that are in the Wi-Fi community, and the lowest priorities to public hotspots that are not in the Wi-Fi community.

The network selection policy server may be configured to differentiate hotspots and/or assign priorities to the hotspots based on the authentication methods used to connect to the networks. Thus, the hotspots associated with the strongest authentication methods may be assigned a higher priority. For example, hotspots associated with WPA and EAP-TLS authentication methods could be given highest priority, followed by hotspots that are in the Wi-Fi community. Hotspots that associated with open authentication (i.e., do not authenticate, web-based, etc.) could be assigned the lowest priority.

Figure 14:
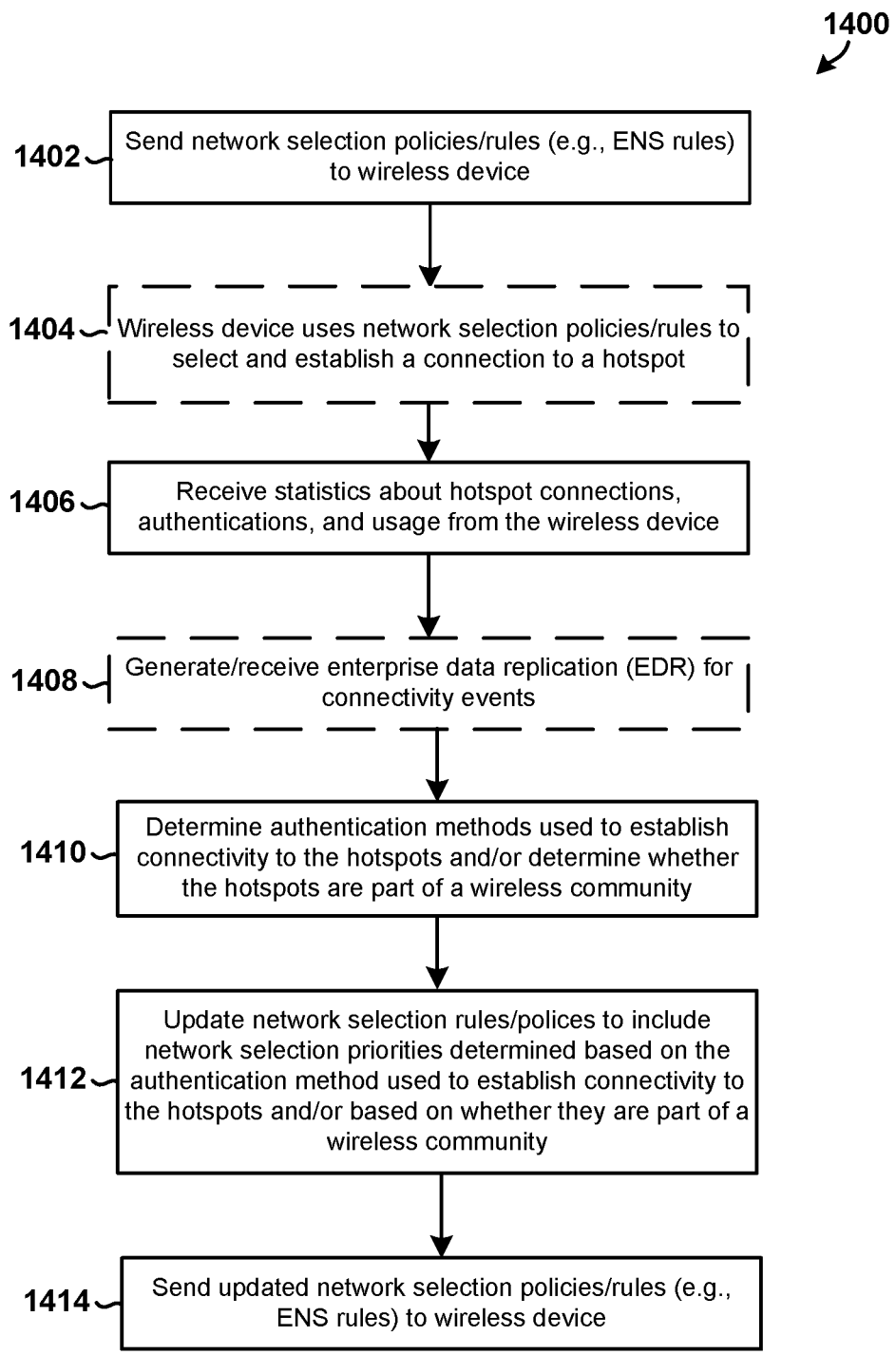
FIG. 14 is a process flow diagram illustrating a method of determining network selection priorities based on authentication patterns in accordance with an embodiment.

FIG. 14 illustrates a method 1400 of determining network selection priorities based on authentication patterns in accordance with an embodiment. All or portions of method 1400 may be performed by a processor or processing core in a computing device that includes/implements all or portions of the network selection policy server. In block 1402, the processor may generate and send network selection policies/rules (e.g., ENS rules) to a wireless device. In optional block 1404, wireless device uses network selection policies/rules to select and establish a connection to a hotspot. In block 1406, the processor may receive statistics about the hotspot connection, authentication, and usage from the wireless device. In optional block 1408, the processor may generate or receive an information structure, such as an enterprise data replication (EDR) structure, for connectivity events. In block 1410, the processor may determine authentication methods used to establish connectivity to the hotspots and/or determine whether the hotspots are part of a wireless community. In block 1412, the processor may update network selection rules/polices to include network selection priorities determined based on the authentication method used to establish connectivity to the hotspots and/or based on whether they are part of a wireless community. In block 1414, the processor may send the updated network selection policies/rules (e.g., ENS rules) to wireless device, which may receive and use the updated network selection policies/rules to make better and more intelligent network selection decisions.

In some embodiments, each hotspot and/or rule may include a "no_retry" parameter that specifies a duration for which that hotspot/rule should not be attempted to be used after an unsuccessful/unsatisfactory connection attempt. For example, if the wireless device determines from the received network selection policies/rules that it should prioritize connecting to a vendor or corporate hotspot (e.g., a STARBUCKS hotspot, etc.), but once connected, is unable to access the Internet, the wireless device may disconnect from that hotspot and does not try reconnecting until the "no_retry" duration has expired. Using the no_retry parameter in this manner prevents a continuous loop of retry attempts. As another example, in some embodiments, the client software may include a "Forget" feature/button that, when actuated, causes the wireless device to disconnect from a hotspot and not attempt to reconnect for the "no_retry" duration.

The network selection policy server may be configured to determine network selection priorities based on the device's network usage patterns, which in turn may be determined based on statistics produced by the wireless device and received by the network selection policy server. The network selection policy server may identify usage patterns when the user is in his/her home (where he/she spends a lot of time and mostly night hours) based on time of usage, based on volume, based on application, etc. For example, the network selection policy server may assign a higher priority to the hotspots that are used for longer periods of time, the hotspots that are used to consume the most data, the hotspots in which the user uses select software applications (e.g., video streaming applications, etc.). As a further example, in a cable scenario, the network operator may be able to determine that a user is connected to the Internet via the same connection as his/her set-top-box.

By intelligently determining priorities for the hotspots and automating the prioritization of the hotspots, the network selection policy server may prevent fraud and abusive usage. For example, the network selection policy server may prevent subscribers from connecting to other hotspots in the Wi-Fi community when a private hotspot is available (e.g., when the user is home). This also prevents accidental fraudulent activity, and allows the network operator to block or restrict (e.g., via a policy management system) certain users from certain community Wi-Fi access points (e.g., hotpots that the user is trying to use in place of his/her home Wi-Fi access point).

Figure 15:
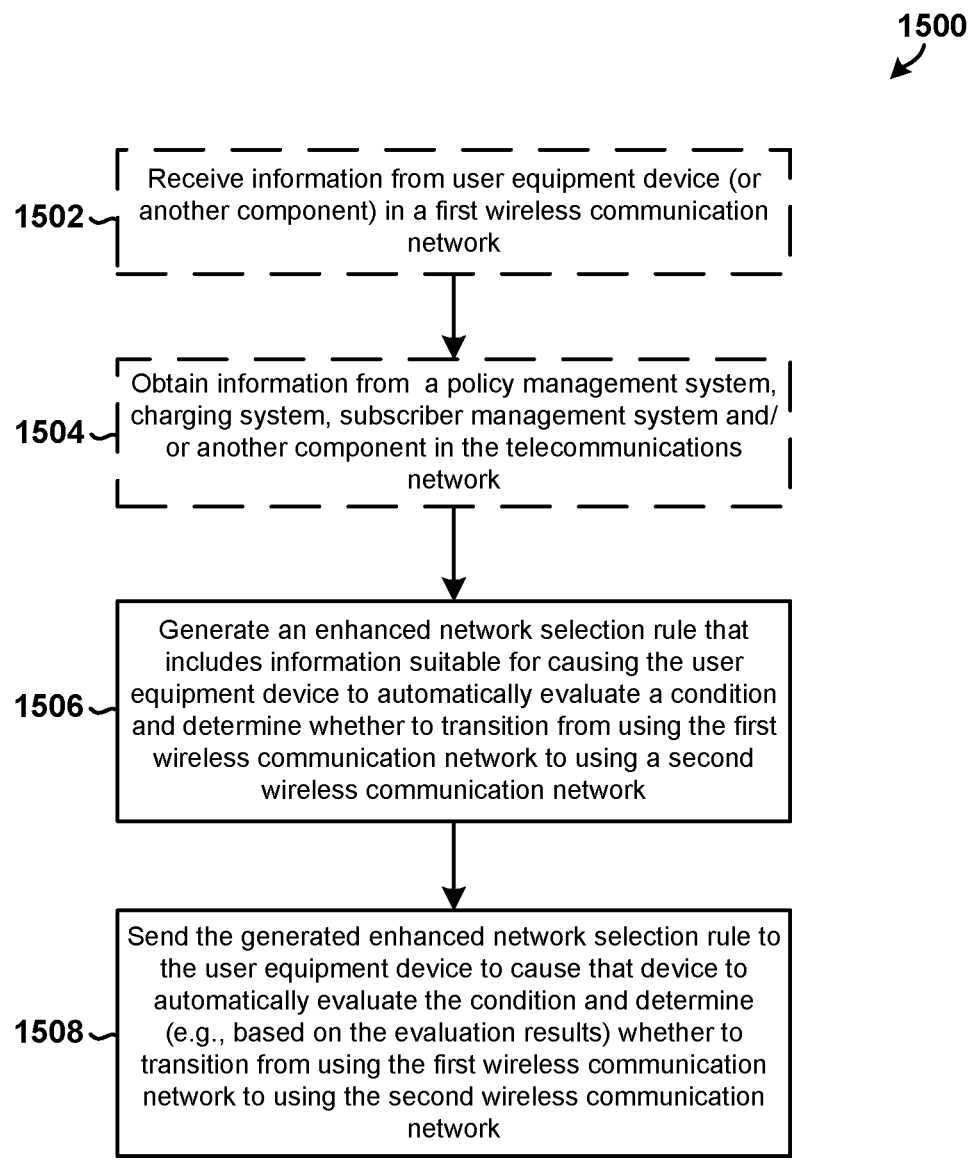
FIG. 15 is a process flow diagram illustrating a method of making network selection decisions and causing a user equipment device to automatically select a wireless communication network in accordance with an embodiment.

FIG. 15 illustrates a method 1500 of making network selection decisions and causing a user equipment device to automatically select a wireless communication network in accordance with an embodiment. Method 1500 may be performed by one or more processors or processing cores of a server computing device that implements all or a portion of the network selection policy server. In optional block 1502, the processor may receive information (e.g., device information, property information, network information, etc.) from a user equipment device (or another component) in a first wireless communication network (e.g., a cellular network, a Wi-Fi network, etc.). In an embodiment, the processor may receive such information via a network selection policy request message. In optional block 1504, the processor may obtain information from a policy management system, charging system, subscriber management system and/or another component in the telecommunications network (e.g., PCC network, etc.).

In block 1506, the processor may generate an enhanced network selection rule (i.e., an ENS rule) that includes information suitable for causing the user equipment device to automatically evaluate a condition and determine whether to transition from using the first wireless communication network to using a second wireless communication network. The condition may be part of a network selection policy or rule and/or determined or selected based on the information received from the user equipment device and/or component in the telecommunications network. The condition may relate to awareness of resources, quality of service of the available access networks, current network utilization rates, signal strength thresholds, quality of experience, network priorities, frequency bands, or any other criterion, rule, policy, or decision discussed in this application. For example, in an embodiment, the condition may be whether a value of a radio link property (e.g., SINR value, RSSI value, etc.) of the first wireless communication network meets or exceeds a threshold value of acceptable radio link properties.

As a further example, in an embodiment, the processor may be configured to generate the enhanced network selection rule to include information suitable for causing the user equipment device to evaluate whether a value of a radio link property of the first wireless communication network meets or exceeds a threshold value of acceptable radio link properties and transition to the second wireless communication network when the value of the radio link property of the first wireless communication network does not meet or exceed the threshold value of acceptable radio link properties. In another embodiment, the processor may be configured to generate the enhanced network selection rule to include information suitable for causing the user equipment device to evaluate whether a value of a radio link property of the second wireless communication network meets or exceeds a threshold value of acceptable radio link properties and transition to the second wireless communication network when the value of the radio link property of the second wireless communication network measured in the user equipment device meets or exceeds the threshold value of acceptable radio link properties. Examples of radio link properties include signal strength, SNR, Arbitrary Strength Unit, data throughput rate, modulation and coding scheme, SINR, RSSI, and link rate. In an embodiment, the radio link property may be measured in the user equipment device. In another embodiment, the radio link property may be measured in another component in the network (e.g., RAN, etc.) and sent to the user equipment device.

In an embodiment, the processor may be configured to generate the enhanced network selection rule to include information suitable for causing the user equipment device to evaluate a lag time value, such as information suitable for causing the device to test one or more conditions for determining whether the user equipment device has remained in the coverage area of the second wireless communication network for a duration or period of time that is greater than or equal to the lag time value.

In an embodiment, the processor may be configured to generate the enhanced network selection rule to include information suitable for causing the user equipment device to evaluate a property of the user equipment device, such as information suitable for causing the device to test one or more conditions for determining whether the device is from a certain manufacturer, is a certain model, has a specific version of an operating system installed, etc.

In an embodiment, the processor may be configured to generate the enhanced network selection rule to include information suitable for causing the user equipment device to evaluate application state and contextual information, such as information suitable for causing the device to test one or more conditions for determining whether any of the software applications operating on the device are streaming audio or video, whether there are applications that are currently not running, whether there are applications that are currently running in the foreground, whether there are applications that are currently running in the background, etc.

In an embodiment, the processor may be configured to generate the enhanced network selection rule in block 1506 in response to receiving a trigger indicating that a new network selection policy/rule (or a new ENS rule) should be sent to the user equipment device. For example, the processor may be configured to receive the trigger, determine a new network selection policy (which may include one or more network selection rules that each test a condition) for the user equipment device relating to the second wireless communication network (which may be a different type of network than the first network), create the determined network selection policy in a format that is suitable for the user equipment device, and generate the enhanced network selection rule to include the network selection policy. In an embodiment, the trigger may be a network selection policy request message. In an embodiment, the trigger may be received from another/different user equipment device. In an embodiment, the trigger may include information measured in the first network, such as a unique identifier for an access point and measurement information identifying jitter, packet loss, end-to-end delay associated with using the access point, an amount of time that the user device has been using the access point, volume of data that has been uploaded and downloaded using the access point, average upload and download speeds that have been obtained using the access point, etc.

In block 1508, the processor may send the generated enhanced network selection rule to the user equipment device to cause that device to automatically evaluate one or more conditions (e.g., determine whether the user equipment being has remained within coverage area of the second wireless communication network for a X amount of time, etc.) to generate evaluation results, and use the evaluation results to determine whether to transition from using the first wireless communication network to using the second wireless communication network. For example, the user equipment device may receive the enhanced network selection rule, identify the network selection policy, detect the second network, determine that the network selection policy relates to the second network, identify the rules network selection policy, evaluate the conditions of the rules to generate evaluation results, use the evaluation results to determine whether rules of the network selection policy can be satisfied, and connect to the second network without user interaction and/or without the user's knowledge in response to determining that the rules of the network selection policy can be satisfied.

In an embodiment, after the user equipment device transitions to using the second network, the device may begin using two or more networks simultaneously. For example, the user equipment device may send and receive data for a first software application via the first network and send and receive data for a second software application via the second network. Said another way, in some embodiments, the user equipment may send traffic across both a cellular network and a Wi-Fi network simultaneously after transitioning from the cellular network to the Wi-Fi network.

In an embodiment, the processor may be further configured to generate a second enhanced network selection rule based on the information included in the first enhanced network selection rule and send the generated second enhanced network selection rule to a second user equipment device of a subscriber associated with the first user equipment device. The processor may generate the second enhanced network selection rule to include network selection rules that are different than the network selection rules included in the first enhanced network selection rule, in a different format than the network selection rules included in the first enhanced network selection rule, and/or via a different protocol than the protocol of first enhanced network selection rule.

Figure 16:
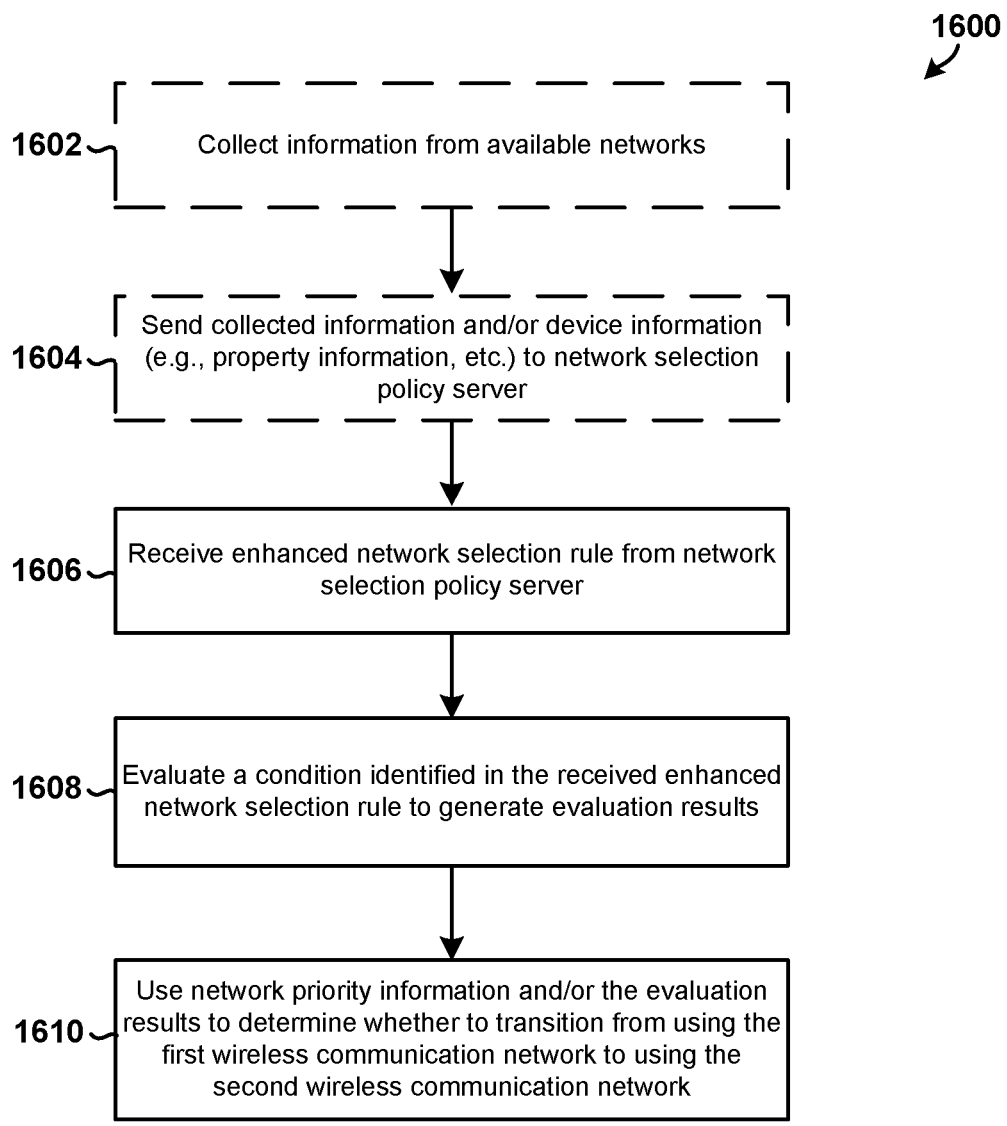
FIG. 16 is a process flow diagram illustrating a method of automatically selecting a wireless communication network in accordance with an embodiment.

FIG. 16 illustrates a method 1600 of automatically selecting a wireless communication network in accordance with an embodiment. Method 1600 may be performed by one or more processors or processing cores in a user equipment device. In optional block 1602, the processor may collect information from one or more the detected/available networks. In optional block 1604, the processor may send the collected information and/or device information (e.g., property information, etc.) to network selection policy server. Examples of device property information include information suitable for identifying the device's manufacturer, model, IMEI, operating system version, a value indicating whether there has been tampering, etc. In block 1606, the processor may receive an enhanced network selection rule (i.e., an ENS rule) from the network selection policy server. In block 1608, the processor may evaluate a condition identified in the received enhanced network selection rule to generate evaluation results. In block 1610, the processor may use network priority information and/or the evaluation results to determine whether to transition from using the first wireless communication network to using the second wireless communication network.

In view of the detailed description and exemplarily embodiments described herein, it will be readily understood by persons skilled in the art that the network selection policy server may be used to create policies relating to any type of network, and it is not limited to the wireless networks explicitly identified herein.

Figure 17:
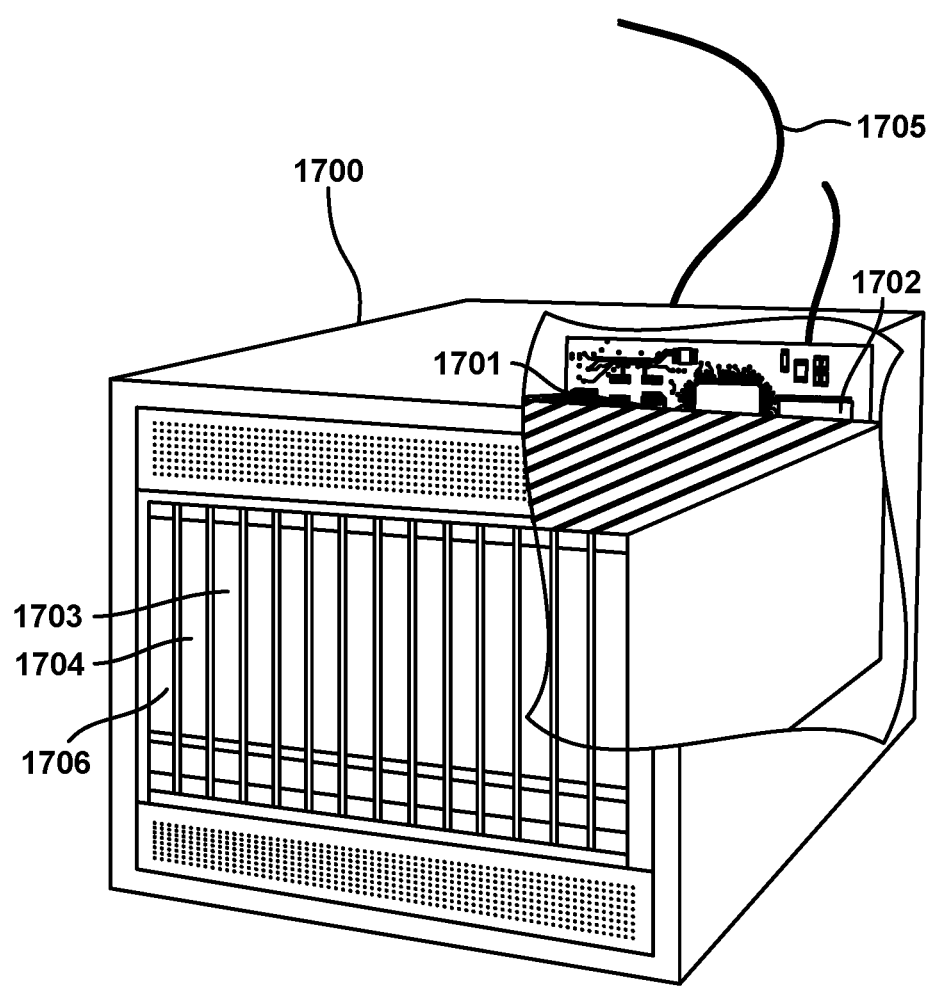
FIG. 17 is a component diagram of server suitable for use with the various embodiments.

The various embodiments may be implemented on any of a variety of commercially available server devices, such as the server 1700 illustrated in FIG. 17. Such a server 1700 typically includes a processor 1701 coupled to volatile memory 1702 and a large capacity nonvolatile memory, such as a disk drive 1703. The server 1700 may also include a floppy disc drive, compact disc (CD) or DVD disc drive 1706 coupled to the processor 1701. The server 1700 may also include network access ports 1704 coupled to the processor 1701 for establishing data connections with a network 1705, such as a local area network coupled to other operator network computers and servers.

The processor 1701 may be any programmable microprocessor, microcomputer or multiple processor chip or chips that can be configured by software instructions (applications) to perform a variety of functions, including the functions of the various embodiments described below. Multiple processors 1701 may be provided, such as one processor dedicated to wireless communication functions and one processor dedicated to running other applications. Typically, software applications may be stored in the internal memory 1702, 1703 before they are accessed and loaded into the processor 1701. The processor 1701 may include internal memory sufficient to store the application software instructions.

The foregoing method descriptions and the process flow diagrams are provided merely as illustrative examples and are not intended to require or imply that the blocks of the various aspects must be performed in the order presented. As will be appreciated by one of skill in the art the order of steps in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory server-readable or processor-readable storage medium. The steps of a method or algorithm disclosed herein may be embodied in a processor-executable software module, which may reside on a non-transitory processor-readable or server-readable storage medium. Non-transitory processor-readable and server-readable media may be any available storage media that may be accessed by a computer or a processor of a computing device. By way of example, and not limitation, such non-transitory processor-readable or server-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a server or processor of a server. Disk and disc, as used herein, includes compact disc (CD), laser disc, optical disc, digital versatile disc (DVD), floppy disk, and blu-ray disc in which disks usually reproduce data magnetically, while discs reproduce data optically with lasers. Combinations of the above should also be included within the scope of non-transitory server-readable media. Additionally, the operations of a method or algorithm may reside as one or any combination or set of codes and/or instructions on a non-transitory processor-readable medium and/or non-transitory server-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of causing a user equipment (UE) device to evaluate a transition condition and select a wireless communication network, comprising:
   determining, via a processor of a network selection policy server, a time threshold value that identifies a minimum amount of time that the UE device should continuously remain in a coverage area associated with a second wireless communication network before attempting to transition from using a first wireless communication network to using the second wireless communication network;
   generating, via the processor of the network selection policy server, an enhanced network selection rule based on the time threshold value; and
   causing the UE device to evaluate the transition condition by sending the generated enhanced network selection rule to the UE device, the evaluation including:
      receiving a beacon that identifies a coverage area associated with the second wireless communication network;
      starting a timer in response to receiving the beacon, wherein the timer increments or decrements a time value;
      repeatedly activating circuitry to detect a presence of the beacon after starting the timer that increments or decrements the time value until the time value meets or exceeds the time threshold value;
      determining whether the beacon was present during each of the repeated activations of the circuitry after the start of the timer and before a determination that the time value meets or exceeds the time threshold value;
      stopping and resetting the timer in response to determining that the beacon was not present during at least one of the repeated activations of the circuitry after the start of the timer and before the determination that the time value meets or exceeds the time threshold value;
      determining whether a value of a radio link property of the first or second wireless communication network meets or exceeds a threshold value of acceptable radio link properties; and
      transitioning from using the first wireless communication network to using the second wireless communication network in response to:
         determining that the beacon was present during each of the repeated activations of the circuitry after the start of the timer and before the determination that the time value meets or exceeds the time threshold value; and
         determining that the value of the radio link property of the first wireless communication network does not meet or exceed the threshold value of acceptable radio link properties or that the value of the radio link property of the second wireless communication network meets or exceeds the threshold value of acceptable radio link properties.

2. The method of claim 1, wherein determining the time threshold value that identifies the minimum amount of time that the UE device should continuously remain in the coverage area associated with the second wireless communication network before attempting to transition from using the first wireless communication network to using the second wireless communication network comprises determining the minimum amount of time that the UE device should remain in a coverage area associated with a Wi-Fi network before attempting to transition from using a cellular network to using the Wi-Fi network.

3. The method of claim 1, wherein the evaluation further includes:
   evaluating a property of the UE device;
   evaluating an application state; or
   evaluating contextual information.

4. The method of claim 1, further comprising:
   receiving a network selection policy request message from the UE device, the received network selection policy request message including information measured by the UE device in the first wireless communication network,
   wherein generating the enhanced network selection rule based on the time threshold value comprises generating the enhanced network selection rule in response to receiving the network selection policy request message from the UE device.

5. The method of claim 1,
   wherein generating the enhanced network selection rule based on the time threshold value comprises generating the enhanced network selection rule to include a network selection policy;
   wherein the network selection policy includes a plurality of network selection rules; and
   wherein the network selection rules are generated based on information obtained from at least one of:
      a policy management system;
      a charging system; or
      a subscriber management system.

6. The method of claim 1, further comprising:
   using a machine learning technique to learn network usage patterns of the UE device over time; and determining priorities for a plurality of wireless communication networks based on the learned network usage patterns, wherein generating the enhanced network selection rule based on the time threshold value further comprises generating the enhanced network selection rule to include information suitable for causing the UE device to select one of the plurality of wireless communication networks based on its priority.

7. The method of claim 1, wherein:

generating the enhanced network selection rule based on the time threshold value further comprises generating the enhanced network selection rule to include:
  at least one active network selection rule; and
  at least one inactive network selection rule; and
the method further comprises:
  activating an inactive network selection rule; or
  deactivating an active network selection rule.

8. A network selection policy server, comprising:
a processor configured with processor-executable instructions to perform operations comprising:
  determining a time threshold value that identifies a minimum amount of time that a user equipment (UE) device should continuously remain in a coverage area associated with a second wireless communication network before attempting to transition from using a first wireless communication network to using the second wireless communication network;
  generating an enhanced network selection rule based on the time threshold value; and
  causing the UE device to evaluate a transition condition by sending the generated enhanced network selection rule to the UE device, the evaluation including:
    receiving a beacon that identifies a coverage area associated with the second wireless communication network;
    starting a timer in response to receiving the beacon, wherein the timer increments or decrements a time value;
    repeatedly activating circuitry to detect a presence of the beacon after starting the timer that increments or decrements the time value until the time value meets or exceeds the time threshold value;
    determining whether the beacon was present during each of the repeated activations of the circuitry after the start of the timer and before a determination that the time value meets or exceeds the time threshold value;
    stopping and resetting the timer in response to determining that the beacon was not present during at least one of the repeated activations of the circuitry after the start of the timer and before the determination that the time value meets or exceeds the time threshold value;
    determining whether a value of a radio link property of the first or second wireless communication network meets or exceeds a threshold value of acceptable radio link properties; and
    transitioning from using the first wireless communication network to using the second wireless communication network in response to:
      determining that the beacon was present during each of the repeated activations of the circuitry after the start of the timer and before the determination that the time value meets or exceeds the time threshold value; and
      determining that the value of the radio link property of the first wireless communication network does not meet or exceed the threshold value of acceptable radio link properties or that the value of the radio link property of the second wireless communication network meets or exceeds the threshold value of acceptable radio link properties.

9. The network selection policy server of claim 8, wherein the processor is configured with processor-executable instructions to perform operations such that determining the time threshold value that identifies the minimum amount of time that the UE device should continuously remain in the coverage area associated with the second wireless communication network before attempting to transition from using the first wireless communication network to using the second wireless communication network comprises determining the minimum amount of time that the UE device should remain in a coverage area associated with a Wi-Fi network before attempting to transition from using a cellular network to using the Wi-Fi network.

10. The network selection policy server of claim 8, wherein the processor is configured with processor-executable instructions to perform operations such that the evaluation further includes:
  evaluating a property of the UE device;
  evaluating an application state; or
  evaluating contextual information.

11. The network selection policy server of claim 8,
  wherein the processor is configured with processor-executable instructions to perform operations further comprising receiving a network selection policy request message from the UE device, the received network selection policy request message including information measured by the UE device in the first wireless communication network; and
  wherein the processor is configured with processor-executable instructions to perform operations such that generating the enhanced network selection rule based on the time threshold value comprises generating the enhanced network selection rule in response to receiving the network selection policy request message from the UE device.

12. The network selection policy server of claim 8, wherein the processor is configured with processor-executable instructions to perform operations such that generating the enhanced network selection rule based on the time threshold value further comprises generating the enhanced network selection rule to include a network selection policy,
  wherein the network selection policy includes a plurality of network selection rules; and
  wherein the network selection rules are generated based on information obtained from at least one of:
    a policy management system;
    a charging system; or
    a subscriber management system.

13. The network selection policy server of claim 8,
  wherein the processor is configured with processor-executable instructions to perform operations further comprising:
    using a machine learning technique to learn network usage patterns of the UE device over time; and
    determining priorities for a plurality of wireless communication networks based on the learned network usage patterns,
  wherein the processor is configured with processor-executable instructions to perform operations such that generating the enhanced network selection rule based on the time threshold value further comprises generating the enhanced network selection rule to include information suitable for causing the UE device to select one of the plurality of wireless communication networks based on its priority.

14. The network selection policy server of claim 8, wherein the processor is configured with processor-executable instructions to perform operations such that generating the enhanced network selection rule based on the time threshold value further comprises generating the enhanced network selection rule to include:
at least one active network selection rule; and
at least one inactive network selection rule; and
wherein the processor is configured with processor-executable instructions to perform operations further comprising:
activating an inactive network selection rule; or
deactivating an active network selection rule.

15. A non-transitory computer readable storage medium having stored thereon processor-executable software instructions configured to cause a processor to perform operations comprising:
determining a time threshold value that identifies a minimum amount of time that a user equipment (UE) device should continuously remain in a coverage area associated with a second wireless communication network before attempting to transition from using a first wireless communication network to using the second wireless communication network;
generating an enhanced network selection rule based on the time threshold value; and
causing the UE device to evaluate a transition condition by sending the generated enhanced network selection rule to the UE device, the evaluation including:
receiving a beacon that identifies a coverage area associated with the second wireless communication network;
starting a timer in response to receiving the beacon, wherein the timer increments or decrements a time value;
repeatedly activating circuitry to detect a presence of the beacon after starting the timer that increments or decrements the time value until the time value meets or exceeds the time threshold value;
determining whether the beacon was present during each of the repeated activations of the circuitry after the start of the timer and before a determination that the time value meets or exceeds the time threshold value;
stopping and resetting the timer in response to determining that the beacon was not present during at least one of the repeated activations of the circuitry after the start of the timer and before the determination that the time value meets or exceeds the time threshold value;
determining whether a value of a radio link property of the first or second wireless communication network meets or exceeds a threshold value of acceptable radio link properties; and
transitioning from using the first wireless communication network to using the second wireless communication network in response to:
determining that the beacon was present during each of the repeated activations of the circuitry after the start of the timer and before the determination that the time value meets or exceeds the time threshold value; and
determining that the value of the radio link property of the first wireless communication network does not meet or exceed the threshold value of acceptable radio link properties or that the value of the radio link property of the second wireless communication network meets or exceeds the threshold value of acceptable radio link properties.

16. The non-transitory computer readable storage medium of claim 15, wherein the stored processor-executable software instructions are configured to cause a processor to perform operations such that determining the time threshold value that identifies the minimum amount of time that the UE device should continuously remain in the coverage area associated with the second wireless communication network before attempting to transition from using the first wireless communication network to using the second wireless communication network comprises determining the minimum amount of time that the UE device should remain in a coverage area associated with a Wi-Fi network before attempting to transition from using a cellular network to using the Wi-Fi network.

17. The non-transitory computer readable storage medium of claim 15, wherein the stored processor-executable software instructions are configured to cause a processor to perform operations such that the evaluation further includes:
evaluating a property of the UE device;
evaluating an application state; or
evaluating contextual information.

18. The non-transitory computer readable storage medium of claim 15,
wherein the stored processor-executable software instructions are configured to cause a processor to perform operations further comprising receiving a network selection policy request message from the UE device, the received network selection policy request message including information measured by the UE device in the first wireless communication network; and
wherein the stored processor-executable software instructions are configured to cause a processor to perform operations such that generating the enhanced network selection rule based on the time threshold value comprises generating the enhanced network selection rule in response to receiving the network selection policy request message from the UE device.

19. The non-transitory computer readable storage medium of claim 15, wherein the stored processor-executable software instructions are configured to cause a processor to perform operations such that generating the enhanced network selection rule based on the time threshold value comprises generating the enhanced network selection rule to include a network selection policy,
wherein the network selection policy includes a plurality of network selection rules, and
wherein the network selection rules are generated based on information obtained from at least one of:
a policy management system;
a charging system; or
a subscriber management system.

20. The non-transitory computer readable storage medium of claim 15, wherein the stored processor-executable software instructions are configured to cause a processor to perform operations further comprising:
using a machine learning technique to learn network usage patterns of the UE device over time; and determining priorities for a plurality of wireless communication networks based on the learned network usage patterns, wherein generating the enhanced network selection rule based on the time threshold value further comprises generating the enhanced network selection rule to include information suitable for causing the UE device to select one of the plurality of wireless communication networks based on its priority.

21. The non-transitory computer readable storage medium of claim 15, wherein the stored processor-executable software instructions are configured to cause a processor to perform operations such that generating the enhanced network selection rule based on the time threshold value further comprises generating the enhanced network selection rule to include:

at least one active network selection rule; and
at least one inactive network selection rule; and wherein the stored processor-executable software instructions are configured to cause a processor to perform operations further comprising:

activating an inactive network selection rule; or
deactivating an active network selection rule.

* * * * *